(12) United States Patent
Vega

(10) Patent No.: US 10,062,537 B1
(45) Date of Patent: Aug. 28, 2018

(54) REDUNDANT FUSE WIRES IN A HOLD-DOWN RELEASE APPARATUS

(71) Applicant: Glenair, Inc., Glendale, CA (US)

(72) Inventor: Edwin E. Vega, Chatsworth, CA (US)

(73) Assignee: Glenair, Inc., Glendale, CA (US)

( * ) Notice: Subject to any disclaimer, the term of this patent is extended or adjusted under 35 U.S.C. 154(b) by 62 days.

(21) Appl. No.: 15/279,501

(22) Filed: Sep. 29, 2016

(51) Int. Cl.
| | |
|---|---|
| *H01H 85/02* | (2006.01) |
| *B64G 1/22* | (2006.01) |
| *H01H 85/046* | (2006.01) |
| *H01H 85/36* | (2006.01) |
| *H01H 85/041* | (2006.01) |
| *H01H 69/02* | (2006.01) |
| *H01H 85/08* | (2006.01) |
| *H01H 85/00* | (2006.01) |
| *H01H 85/06* | (2006.01) |
| *F16B 21/09* | (2006.01) |
| *B64G 1/64* | (2006.01) |
| *H01B 1/02* | (2006.01) |

(52) U.S. Cl.
CPC ............... *H01H 85/36* (2013.01); *B64G 1/64* (2013.01); *F16B 21/09* (2013.01); *H01B 1/02* (2013.01); *H01H 69/02* (2013.01); *H01H 85/00* (2013.01); *H01H 85/0039* (2013.01); *H01H 85/041* (2013.01); *H01H 85/06* (2013.01); *H01H 85/08* (2013.01); *H01H 2235/01* (2013.01)

(58) Field of Classification Search
CPC .... H01H 85/0039; H01H 85/00; H01H 85/36; H01H 85/06; H01H 69/02; H01H 85/041; H01H 85/08; H01H 2235/01; B64G 1/64; F16B 21/09; H01B 1/02

USPC ......................... 337/142, 143, 154, 244, 401
See application file for complete search history.

(56) References Cited

U.S. PATENT DOCUMENTS

| | | | | |
|---|---|---|---|---|
| 2,797,279 A | * | 6/1957 | Brandt .................. | H01H 69/02 337/244 |
| 2,914,636 A | * | 11/1959 | Kozacka ............. | H01H 85/303 337/158 |
| 3,179,774 A | * | 4/1965 | Swain ................. | H01H 85/303 337/231 |

(Continued)

OTHER PUBLICATIONS

Thurn et al; A Nichrome Burn Wire Release Mechanism for CubeSats; 41st Aerospace Mechanisms Symposium; JPL May 16-18, 2012.

(Continued)

*Primary Examiner* — Anatoly Vortman
(74) *Attorney, Agent, or Firm* — David S. Alavi

(57) ABSTRACT

A release apparatus includes a coiled restraining wire with each end attached to a corresponding fuse wire. The fuse wires are supplied with respective actuation electric currents by respective independent current sources. Flow of actuation current through a fuse wire causes that fuse wire to break; breakage of either one or both fuse wires allows the restraining wire to partially uncoil and allow the release apparatus to transition from a retained condition to a released condition, by allowing disengagement of retention members from a release member that can then move out of the release apparatus. The release apparatus can be employed to attach a deployable component to a satellite or spacecraft, and can be readily repaired, refurbished or reset for repetitive ground testing.

28 Claims, 25 Drawing Sheets

(56) References Cited

U.S. PATENT DOCUMENTS

| | | | | |
|---|---|---|---|---|
| 3,319,027 A * | 5/1967 | Hitchcock | .......... | H01H 85/0452 29/623 |
| 3,657,679 A * | 4/1972 | Wilson | ................ | H01H 85/303 337/244 |
| 3,783,428 A * | 1/1974 | Swain | .................. | H01H 85/303 337/148 |
| 5,471,888 A * | 12/1995 | McCormick | ........... | A62C 37/10 137/76 |
| 5,606,889 A * | 3/1997 | Bielinski | ................ | G05G 17/00 137/76 |
| 5,621,373 A * | 4/1997 | McCormick | ........... | A62C 37/12 137/76 |
| 5,771,742 A * | 6/1998 | Bokaie | ..................... | B64G 1/22 337/140 |
| 5,886,613 A * | 3/1999 | Magoon | ............... | H01H 85/303 337/241 |
| 6,133,818 A * | 10/2000 | Hsieh | ..................... | B64G 1/222 337/1 |
| 6,249,063 B1 | 6/2001 | Rudoy et al. | | |
| 6,269,748 B1 | 8/2001 | Rudoy et al. | | |
| 6,371,777 B1 | 4/2002 | Rudoy et al. | | |
| 6,433,990 B1 | 8/2002 | Rudoy et al. | | |
| 6,450,064 B1 * | 9/2002 | Christiansen | .......... | B64G 1/645 403/343 |
| 6,525,920 B2 | 2/2003 | Rudoy et al. | | |
| 6,747,541 B1 | 6/2004 | Holt et al. | | |
| 7,396,182 B2 * | 7/2008 | Retat | ...................... | B64G 1/222 337/150 |
| 8,021,069 B2 * | 9/2011 | Baghdasarian | ........ | B64G 1/645 337/401 |
| 8,568,053 B2 * | 10/2013 | Baghdasarian | ........ | B64G 1/222 403/2 |
| 8,904,781 B2 * | 12/2014 | Buttolph | ................ | F03G 7/065 337/1 |
| 8,904,889 B2 | 12/2014 | Rudoy et al. | | |
| 9,085,377 B2 * | 7/2015 | Baghdasarian | ........ | B64G 1/222 |
| 2002/0080547 A1 * | 6/2002 | Rudoy | .................. | B64G 1/222 361/161 |

OTHER PUBLICATIONS

Co-owned U.S. Appl. No. 15/249,351, filed Aug. 27, 2016 in the name of Vega.

Co-owned U.S. Appl. No. 15/279,515, filed Sep. 29, 2016 in the name of Vega.

* cited by examiner

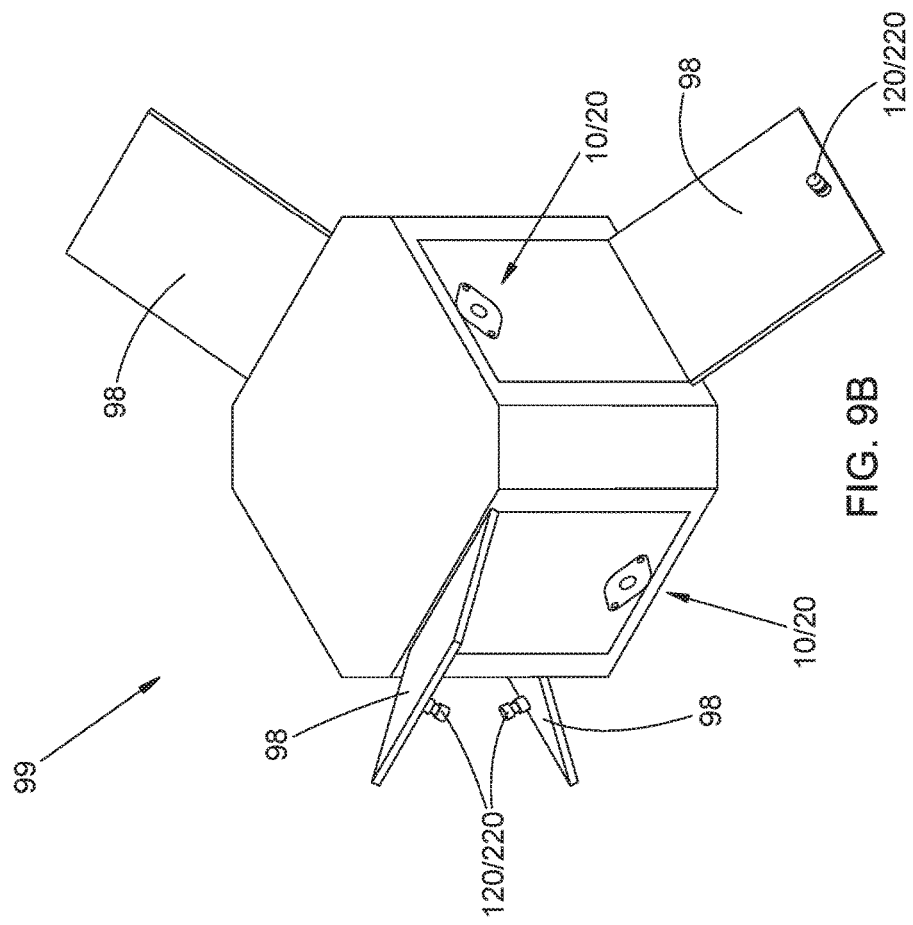
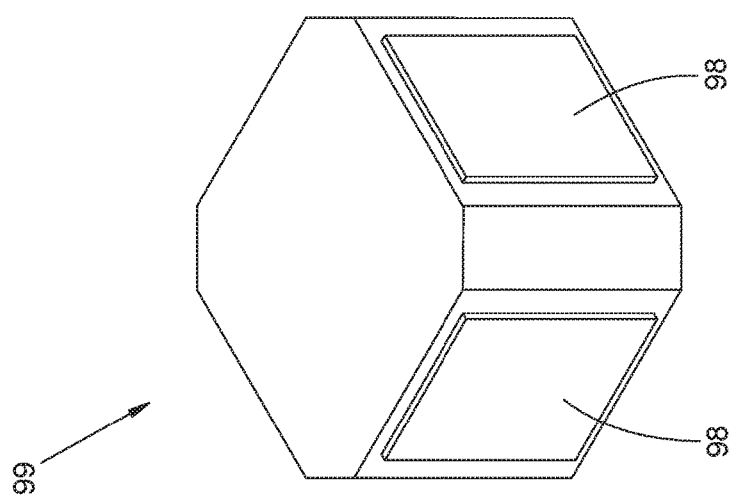

REDUNDANT FUSE WIRES IN A HOLD-DOWN RELEASE APPARATUS

FIELD OF THE INVENTION

The field of the present invention relates to hold-down release mechanisms. In particular, hold-down release apparatus and methods are disclosed that incorporate redundant fuse wires.

SUMMARY

A hold-down release apparatus comprises a housing, a release member, one or more retention members, a restraining wire, first and second fuse wires, and first and second isolation members. Each one of the one or more retention members is movable within the housing between a corresponding retention position and a corresponding release position. With each one of the one or more retention members in the corresponding release position, the release member is moveable from a retained position at least partly within the housing to an exterior space outside the housing; with each one of the one or more retention members in the corresponding retention position, the one or more retention members obstruct movement of the release member from the retained position to the exterior space. The restraining wire (i) forms multiple coils, (ii) is moveable between a tightened coil arrangement and a loosened coil arrangement, (iii) is biased toward the loosened coil arrangement by a coil bias force, (iv) in the tightened coil arrangement, obstructs movement of each one of the one or more retention members from the corresponding retention position to the corresponding release position, and (v) in the loosened coil arrangement, permits movement of each one of the one or more retention members from the corresponding retention position to the corresponding release position. A first end of the restraining wire is held by the first fuse wire and a second end of the restraining wire is held by the second fuse wire, thereby holding the restraining wire in the tightened coil arrangement against the coil bias force. The first end of the restraining wire is insulated electrically from the first fuse wire by the first isolation member; the second end of the restraining wire is insulated electrically from the second fuse wire by the second isolation member. With a first electrical actuation current flowing through the first fuse wire, the coil bias force is sufficient to break the first fuse wire; with a second electrical actuation current flowing through the second fuse wire, the coil bias force is sufficient to break the second fuse wire. The restraining wire is arranged so that breakage of only the first fuse wire, breakage of only the second fuse wire, or breakage of both the first and second fuse wires is sufficient to enable (i) movement of the restraining wire from the tightened coil arrangement to the loosened coil arrangement in response to the coil bias force, (ii) movement of the one or more retention members from the corresponding retention positions to the corresponding release positions, and (iii) movement of the release member from the retained position to the exterior space.

The release apparatus can be employed to attach a deployable component to a satellite. The housing can be attached to the body of the satellite, and the release member can be attached to the deployable component of the satellite. With the release member held in the retained position by the retention member in the retention position, the release member holds the deployable component in a non-deployed arrangement. With the retention member in the release position, movement of the release member from the retained position to the exterior space enables movement of the deployed component from the non-deployed arrangement into a deployed arrangement.

After breakage of one or both fuse wires by corresponding actuation currents, the release apparatus can be repaired or refurbished and then reset with the release member held in the retained position. The release member is returned to the retained position and the retention members are returned to the corresponding retention positions. One or more of the restraining wire, the first or second fuse wires, or the first or second isolation members are replaced; in some instances, all of those elements can be replaced. After the replacement, (i) the restraining wire is arranged in the tightened coil arrangement, (ii) the first fuse wire is arranged within the housing to hold the first end of the restraining wire against the coil bias force, (iii) the second fuse wire is arranged within the housing to hold the second end of the restraining wire against the coil bias force, (iv) the first isolation member is arranged so as to insulate electrically the first end of the restraining wire from the first fuse wire, and (v) the second isolation member is arranged so as to insulate electrically the second end of the restraining wire from the second fuse wire. The restraining wire, the first and second fuse wires, and the first and second isolation members can be replaced as a pre-assembled initiator assembly.

Objects and advantages pertaining to hold-down release apparatus and methods may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 9A and 9B are schematic perspective views of a satellite with deployable components in non-deployed and deployed arrangements, respectively.

Figure 1A:
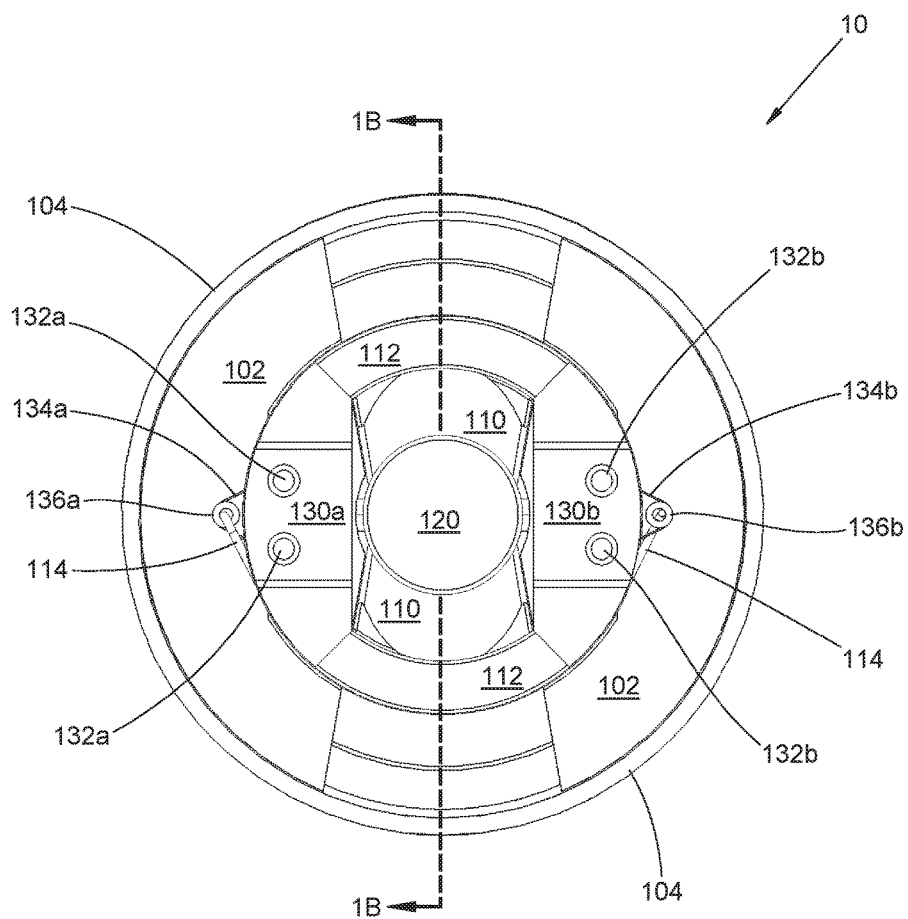
FIGS. 1A, 1B, and 1C are top, side cross-sectional, and perspective views of a first example of an inventive release apparatus in a retained condition.

The embodiments depicted are shown only schematically: all features may not be shown in full detail or in proper proportion, certain features or structures may be exaggerated relative to others for clarity, and the drawings should not be regarded as being to scale. The embodiments shown are only examples: they should not be construed as limiting the scope of the present disclosure or appended claims. The terms top, bottom, side, horizontal, vertical, and so forth are used only for convenience of description and are defined relative to the views shown in the drawings; those terms are not intended to indicate absolute spatial directions, or directions relative to earth's surface or gravitational field.

DETAILED DESCRIPTION OF EMBODIMENTS

A first example of a hold-down release apparatus 10 is shown in FIGS. 1A-1C, 2A-2C, 3A-3C, and 4A-4C. The example release apparatus 10 comprises a housing (including a base 102, lateral housing 104, and a top cover 106, which can be discrete parts or integrally formed in any suitable combinations), a release member 120, one or more retention members 110, a restraining wire 114, first and second fuse wires 134a/134b, and first and second isolation members 136a/36b. Each retention member 110 is movable within the housing between a corresponding retention position and a corresponding release position. With each retention member 110 in the corresponding release position (as in FIGS. 3A-3C and 4A-4C), the release member 120 is moveable from a retained position at least partly within the housing (as in FIGS. 3A-3C) to an exterior space outside the housing (as in FIGS. 4A-4C). With one or more retention members 110 in the corresponding retention position(s) (as in FIGS. 1A-1C and 2A-2C), the one or more retention members 110 obstruct movement of the release member 120 from the retained position to the exterior space.

The housing, release member 120, and the one or more retention members 110 can comprise any one or more suitably rigid and strong materials; each of those elements can be the same one or more materials as the others, or can differ with respect to material composition. Stainless steel is commonly employed. The release member 120 and the one or more retention members 110 can be arranged in any suitable, desirable, or necessary way. A common form for the release member 120 is a rod that is adapted along a first portion to engage the retention member(s) 110 and adapted along a second portion (e.g., internally or externally threaded; internally threaded in the examples shown) for engaging a deployable component that is to be secured by the hold-down apparatus 10. The release member 120 can be adapted in any other suitable way for engaging the deployable component. The first portion of the release member can include a groove, flange, ridge, or other structural feature for engaging the retention member(s) 110 when the release member 120 is held in the retained position by the retention member(s) 110. Other suitable arrangements can be employed. A common form for a retention member 110 is a truncated wedge or roughly annular sector (in the horizontal dimensions) with a sloped or oblique top surface; the narrower end of each retention member 110 engages the groove of the release member 120. Typically, movement of retention members 110 thus arranged is substantially radial and therefore substantially perpendicular to the release member axis. In the examples shown, with the release member 120 in the retained position and the one or more retention members 110 in the corresponding retention position(s), the oblique engagement surface of each retention member 110 (i.e., the sloped surface of each truncated wedge) engages a corresponding oblique engagement surface of the release member 120 (e.g., a circumferential groove with a sloped side wall in the examples shown). An arrangement with such oblique engagement surfaces enables a load force on the release member 120 (e.g., the weight of the deployable component, or a deployment bias force exerted on and/or by the deployable component), that biases the release member 120 away from the retained position, to result in a transmitted force biasing the retention member(s) 110 toward the corresponding release position(s). In other examples, one or more separate, distinct bias members (e.g., springs) can be employed to bias the retention member(s) 110 toward the corresponding release position(s).

Load forces on the release member 120 arise primarily from whatever object or component is attached to it (i.e., a deployable component), to be held down by the release apparatus 10 but then released on command. Such load forces can arise from the weight or inertia of the attached object, or from a bias force applied by or to the attached object to facilitate or propel its release (discussed further below). The release member 120 can be arranged or structurally adapted in any suitable way to allow attachment of an object or component to be released. In the example shown, an internally threaded hole enables attachment of the object or component. Other structural features or adaptations, e.g., external threads, transverse threaded or unthreaded holes, pins, lugs, studs, a bayonet mechanism, and so forth, can be suitably employed.

In some examples, including those shown in the Figures, movement of the one or more retention members 110 toward the corresponding release positions is substantially perpendicular to movement of the release member 120 from the retained position to the exterior space. In some examples, a portion of the housing (e.g., the base portion 102) can be arranged so as to constrain movement of each retention member 110 to substantially radial movement between its corresponding retention and release position (relative to an axis substantially parallel to the movement of the release member 120). Such constraint can be achieved by employed one or more suitably arranged rails, slots, ridges, channels, bearings, guide rods, or other suitable structural elements for engaging the one or more retention members 110 with a portion of the housing (e.g., at the base 102 of the housing). In some examples, to facilitate attachment of a deployable component to a threaded portion of the release member 120, or to prevent or limit rotation of the deployable component, the release member 120 can be suitably adapted to engage a portion of the housing so as to obstruct rotation of the release member 120 about the axis substantially parallel to the movement of the release member 120. In one example (FIGS. 5A-8C), a diamond-shaped protrusion of the release member 220 is received in a corresponding hole in the housing.

The restraining wire 114 forms multiple coils, and is moveable between a tightened coil arrangement (as in FIGS. 1A-1C) and a loosened coil arrangement (as in FIGS. 2A-2C, 3A-3C, and 4A-4C). The restraining wire 114 is biased toward the loosened coil arrangement by a coil bias force. In some examples, the restraining wire 114 is elastically deformed into the tightened coil arrangement, so that the resulting elastic restoring force biases the restraining wire 114 toward the loosened coil arrangement. A typical material for such a "self-biased" restraining wire is stainless steel. Other one or more suitably strong and deformable materials can be employed; the deformation need not be elastic, if the coil bias force can be provided in some other way. In some examples, one or more distinct bias elements (e.g., one or more springs or tension elements, separate from the restraining wire 114) can be employed to bias the restraining wire 114 toward the loosened coil arrangement. In some examples, a load force on the release member 120 can be transmitted through the retention members 110 to provide the coil bias force; that or other such indirect load forces on the retaining wire 114 often are present and can act as part of the coil bias force even if a coil bias force is provided in some other way. Multiple sources of the coil bias force can be employed in any suitable combination.

In the tightened coil arrangement, the restraining wire 114 obstructs movement of the one or more retention members 110 from the corresponding retention position(s) to the corresponding release position(s). The obstruction can be direct in some examples, with the tightened restraining wire 114 positioned against the retention members 110. In other examples (including the examples disclosed herein) the obstruction can be indirect, e.g., with secondary retention members interposed between the restraining wire 114 and the retention members 110 (such as the secondary retention elements 112 in FIGS. 1A-4C), or with secondary retention members arranged so as to mechanically couple the restraining wire 114 and the retention members 110 (such as the retention sleeve 216 and the sleeve retainers 212 in FIGS. 5A-8C). In the loosened coil arrangement, the restraining wire 114 permits movement of the one or more retention members 110 from the corresponding retention position(s) to the corresponding release position(s). As noted above, the obstruction of movement of the retention member(s) 110 by the restraining wire 114 can in some instances also transmit indirectly a load force on the release member 120 as at least a portion of the coil bias force that biases the restraining wire 114 toward the loosened coil arrangement.

In some examples, the multiple coils formed by the restraining wire 114 are positioned around the one or more retention members 110, obstructing their movement to the corresponding release positions by direct contact with the restraining wire 114, or by indirect contact via one or more interposed secondary retention members 112 (e.g., as in FIGS. 1A-4C). The one or more interposed secondary retention members 112 are movable between corresponding secondary retention position(s) and corresponding secondary release position(s).

In other examples, a more complex arrangement of the one or more retention members and one or more secondary retention members can be employed; a specific one of those examples in shown in FIGS. 5A-8C. The one or more secondary retention members (retention sleeve 216 and sleeve retainers 212) are movable within the housing between corresponding secondary retention positions (an engaged sleeve position for the retention sleeve 216 and corresponding sleeve-retaining position(s) for the sleeve retainers 212) and corresponding secondary release positions (a disengaged sleeve position and corresponding sleeve-release position(s), respectively). With each secondary retention member 212/216 in its corresponding secondary release position (as in FIGS. 7A-7C and 8A-8C), the one or more retention members 210 are moveable from the corresponding retention position(s) (FIGS. 5A-5C and 6A-6C) to the corresponding release position(s) (FIGS. 7A-7C and 8A-8C). With each secondary retention member 212/216 in its corresponding secondary retention position (FIGS. 5A-5C), movement of the one or more retention members 210 from the corresponding retention position(s) to the corresponding release position(s) is obstructed (directly obstructed by the retention sleeve 216 in the engaged sleeve position in this example; indirectly by the sleeve retainers 212 in the corresponding sleeve-retention positions). The multiple coils formed by the restraining wire 214 are positioned around at least one of the one or more secondary retention members (around sleeve retainers 212 in this specific example, but not around the sleeve 216), but not necessarily around the one or more retention members 210 (not around the retention members 210 in this specific example). With the restraining wire 214 in the tightened coil arrangement, the restraining wire 214 obstructs movement of the one or more secondary retention members (the sleeve retainers 212) from the corresponding secondary retention position to the corresponding secondary release position, thereby obstructing movement of the one or more retention members 210 from the corresponding retention positions to the corresponding release positions (because the sleeve retainers 212 hold the retaining sleeve 216 in the engaged sleeve position, which in turn obstructs movement of the retention members 210). With the restraining wire 214 in the loosened coil arrangement, the restraining wire 214 permits movement of the one or more secondary retention members (the sleeve retainers 212) from the corresponding secondary retention positions to the corresponding secondary release positions, thereby permitting movement of the one or more retention members 210 from the corresponding retention positions to the corresponding release positions (by permitting movement of the retaining sleeve 216 to the disengaged sleeve position). The specific example of FIGS. 5A-8C is described further below.

Figure 1B:
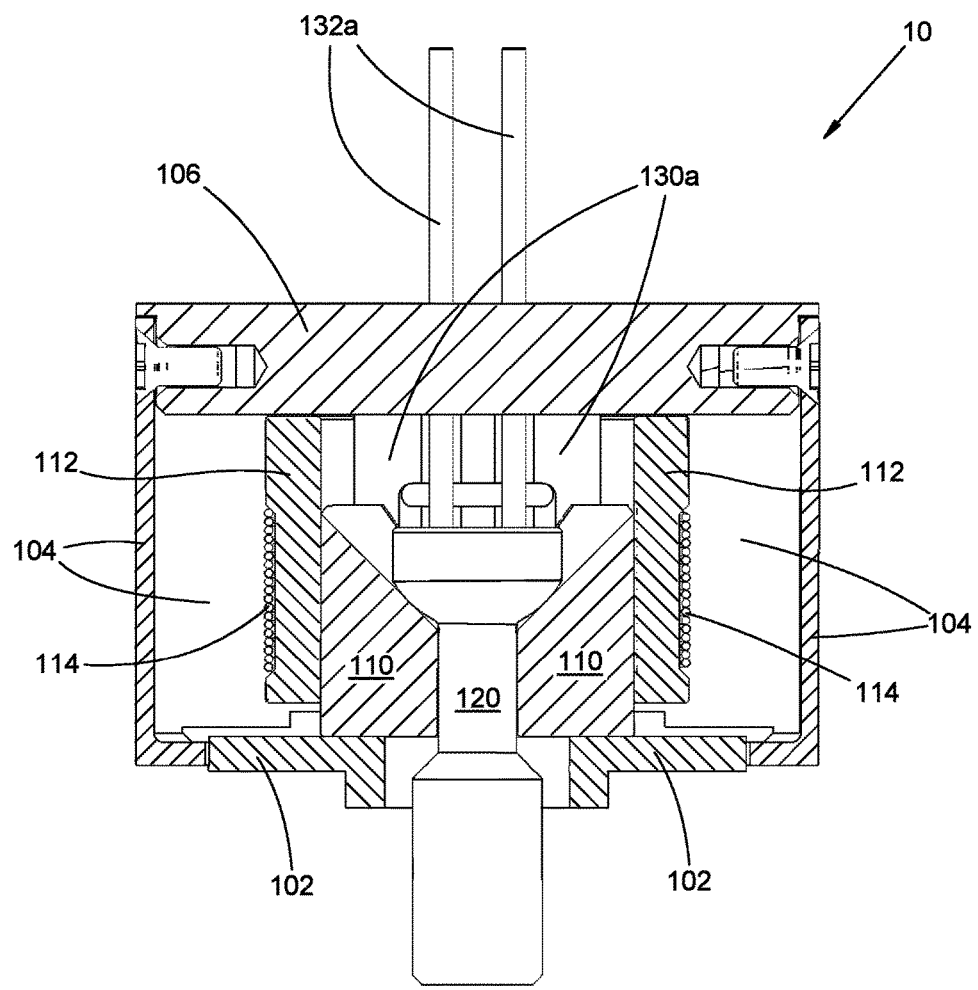
Figure 1C:
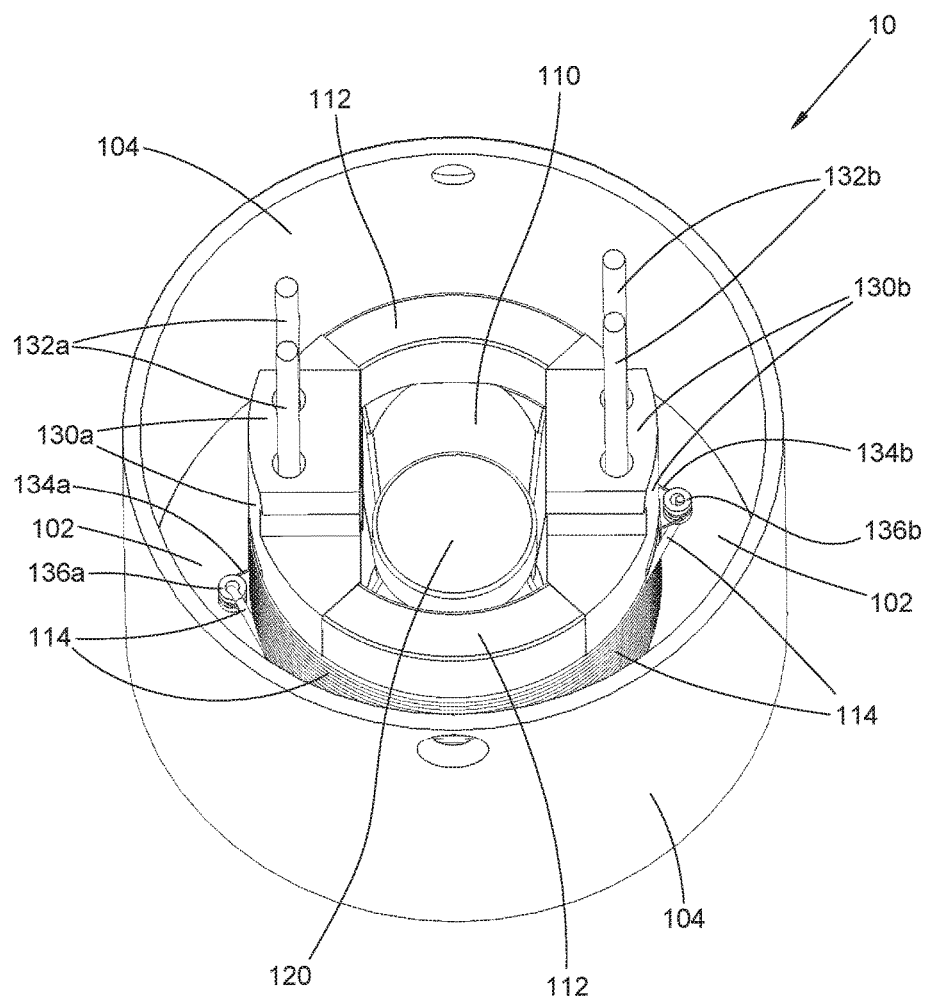
Figure 2A:
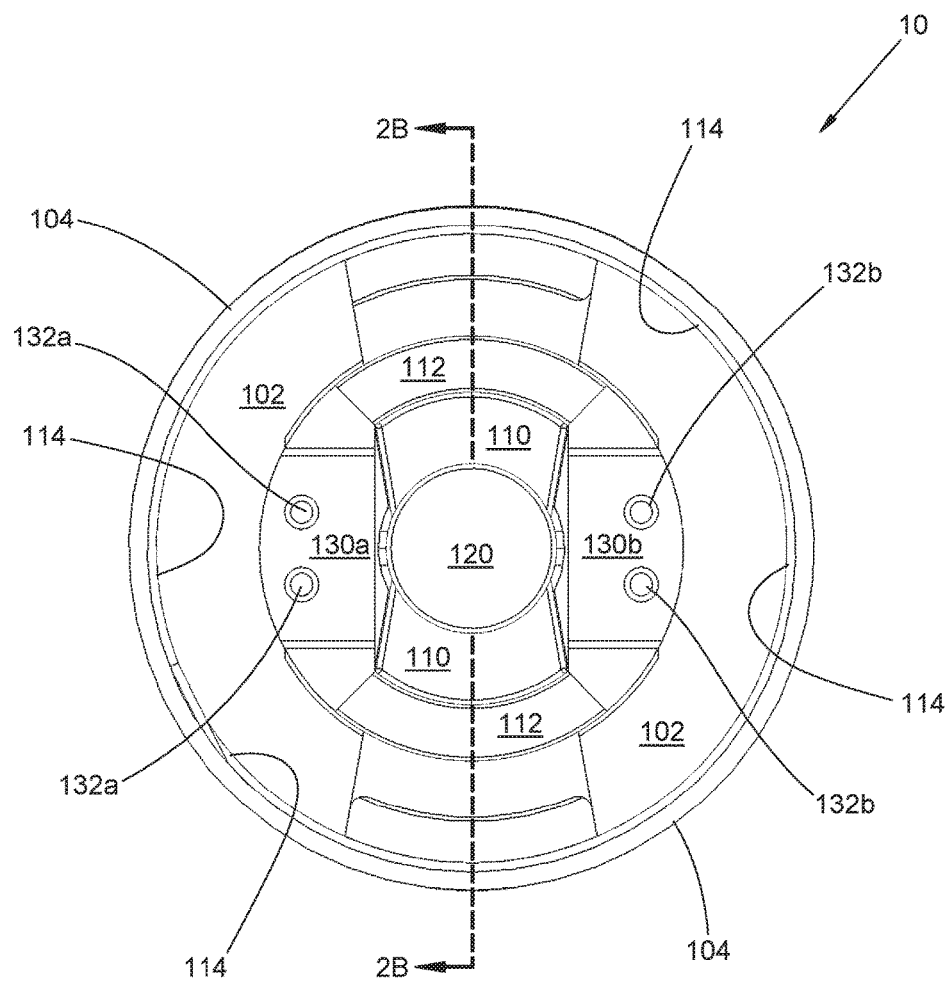
FIGS. 2A, 2B, and 2C are top, side cross-sectional, and perspective views of the first example of the inventive release apparatus after breaking of one or more fuse wires and loosening of the restraining wire.
Figure 2B:
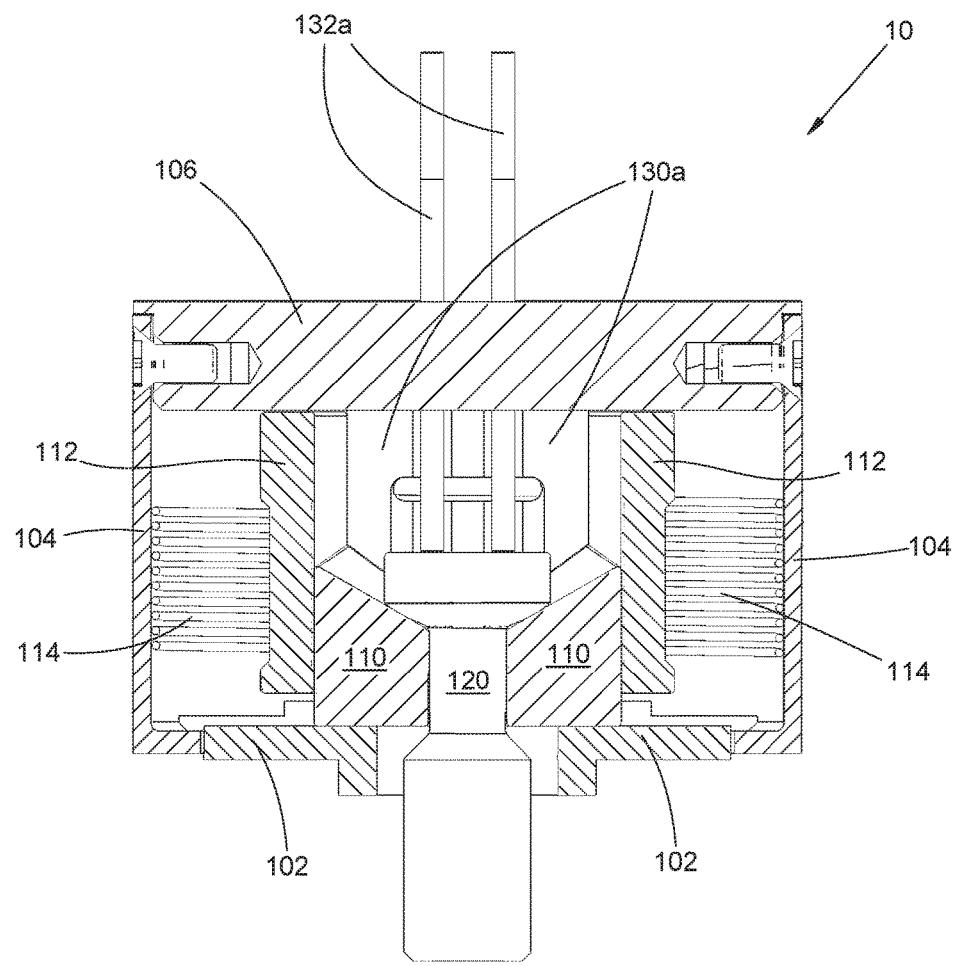
Figure 2C:
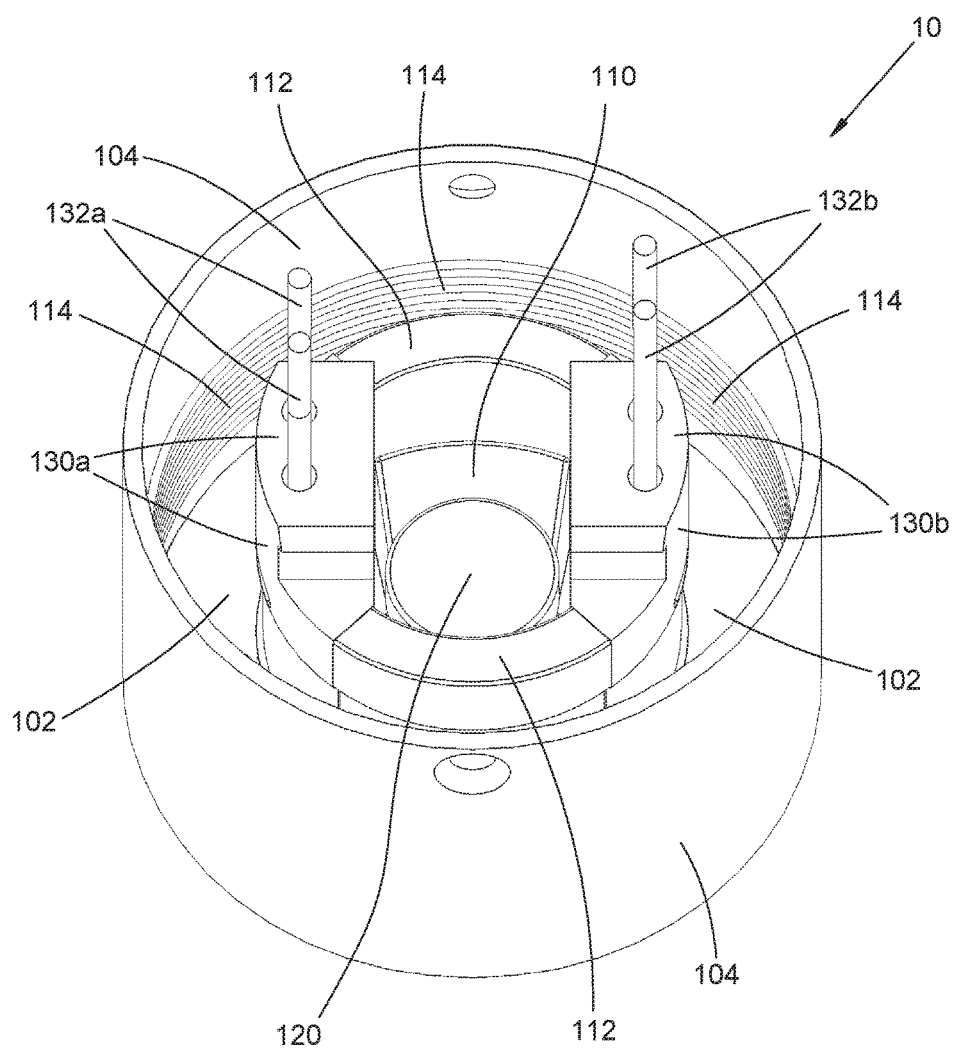
Figure 3A:
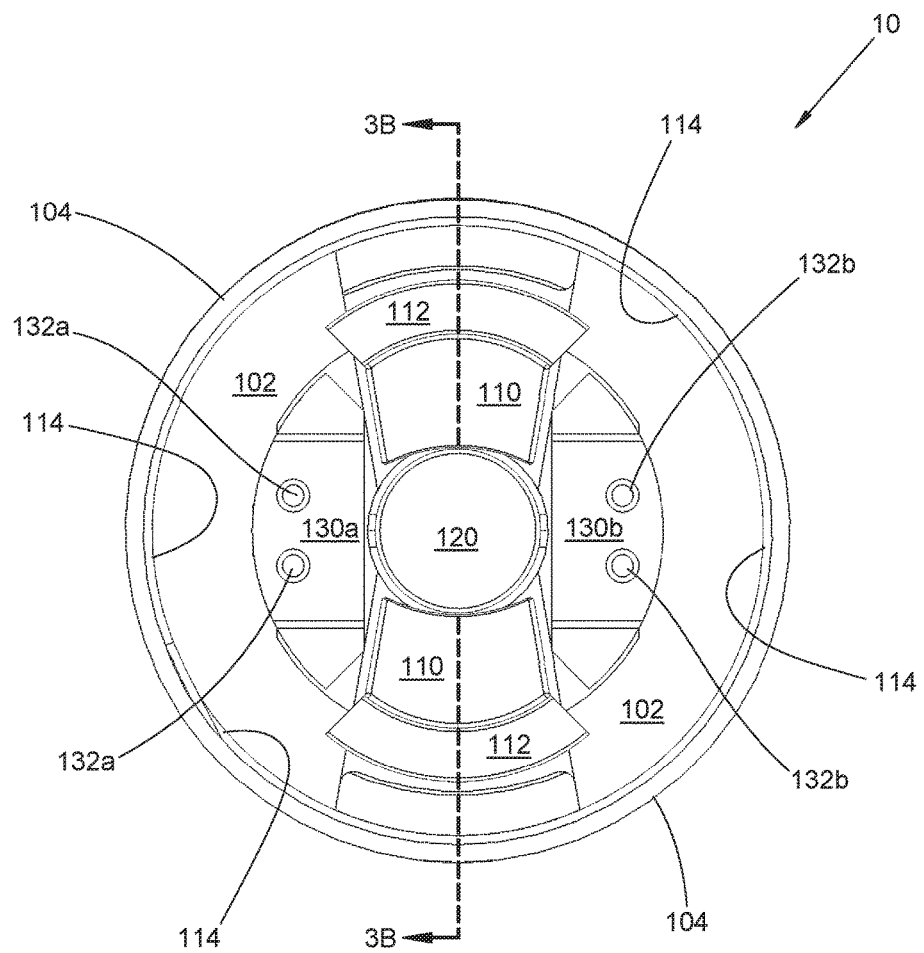
FIGS. 3A, 3B, and 3C are top, side cross-sectional, and perspective views of the first example of the inventive release apparatus after movement of one or more retention members.
Figure 3B:
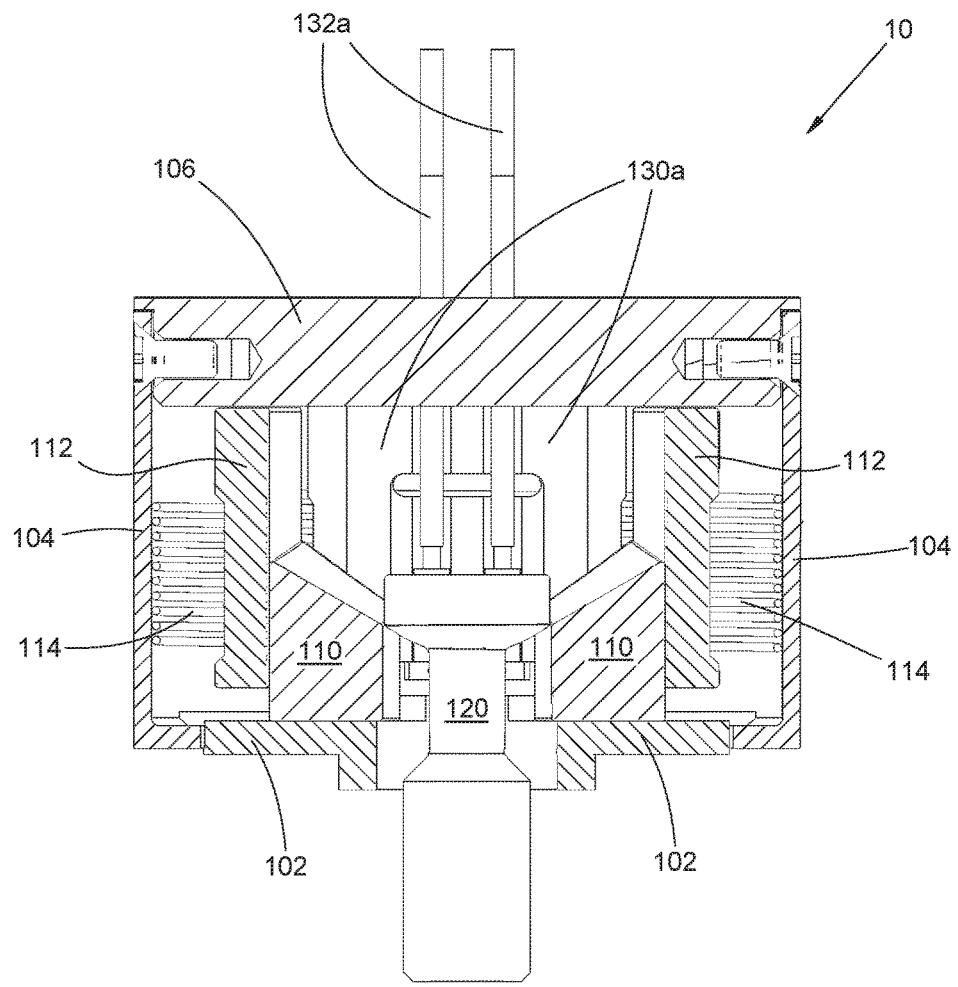
Figure 3C:
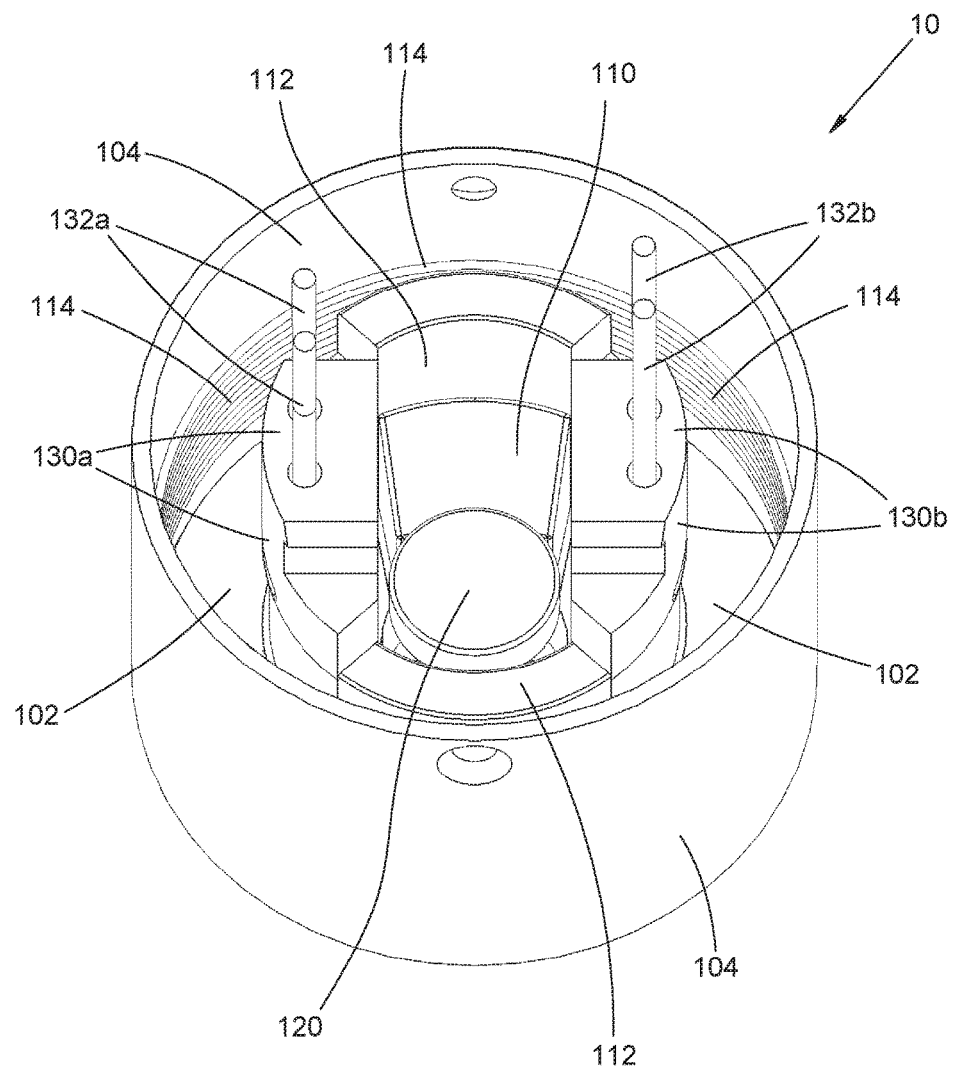
Figure 4A:
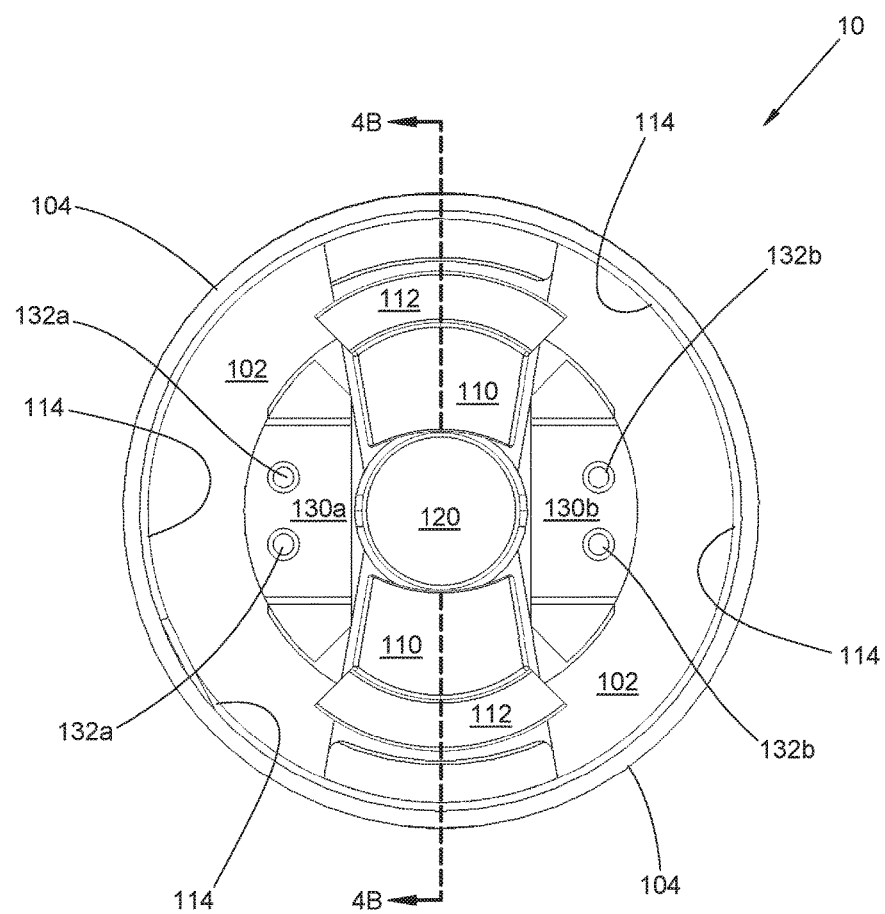
FIGS. 4A, 4B, and 4C are top, side cross-sectional, and perspective views of the first example of the inventive release apparatus in a released condition.
Figure 4B:
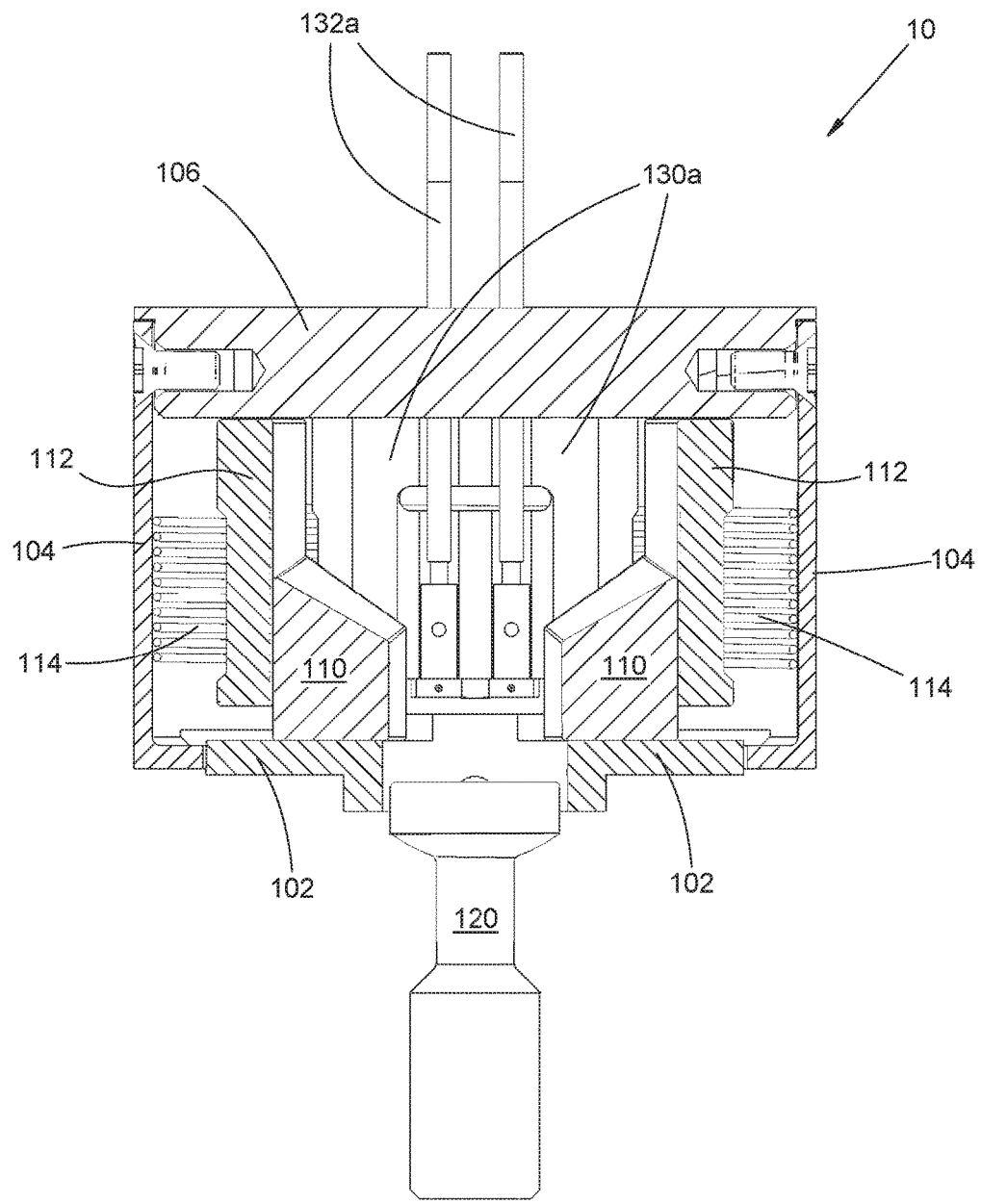
Figure 4C:
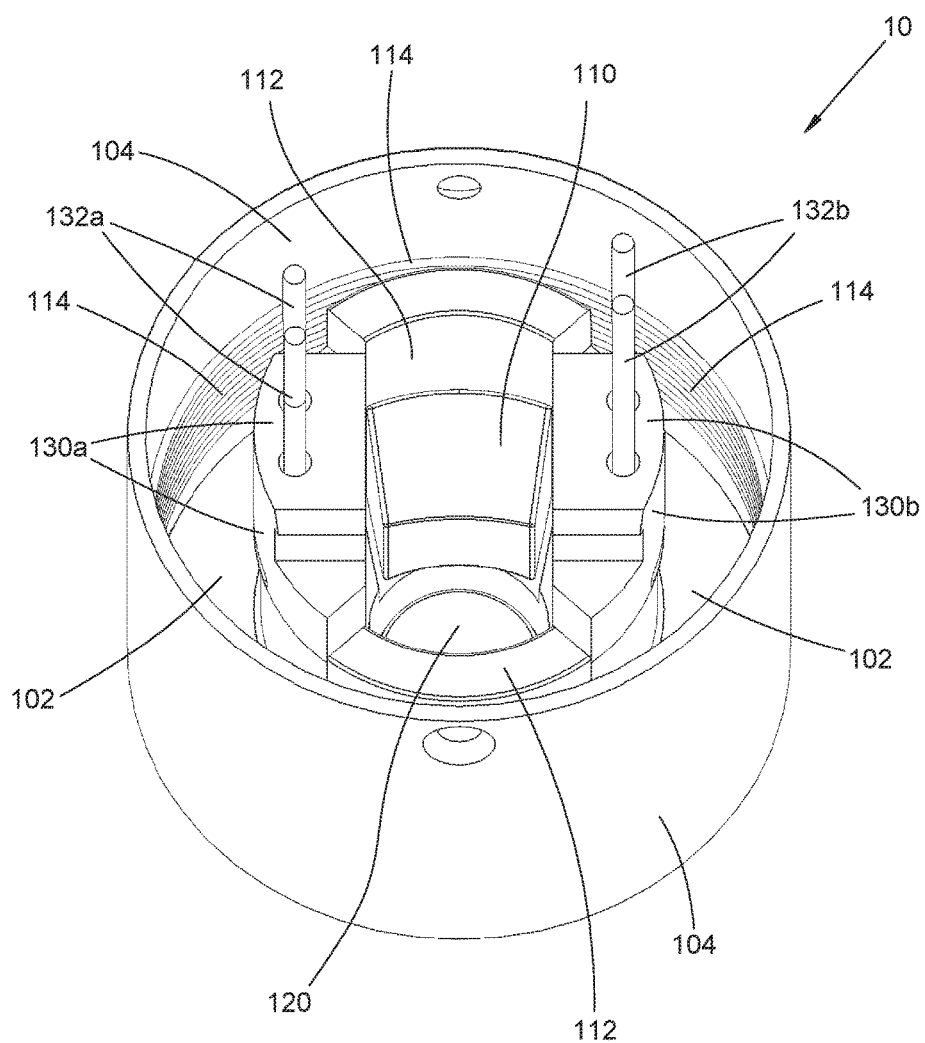
Figure 5A:
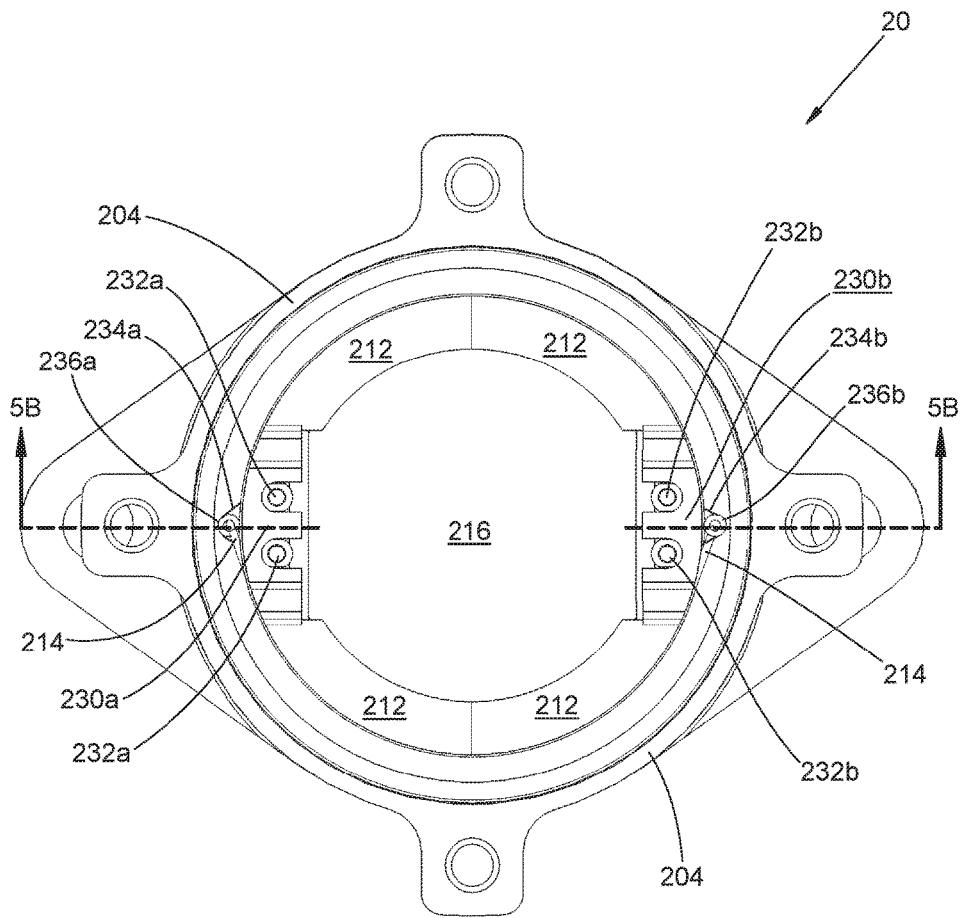
FIGS. 5A, 5B, and 5C are top, side cross-sectional, and perspective views of a second example of an inventive release apparatus in a retained condition.
Figure 5B:
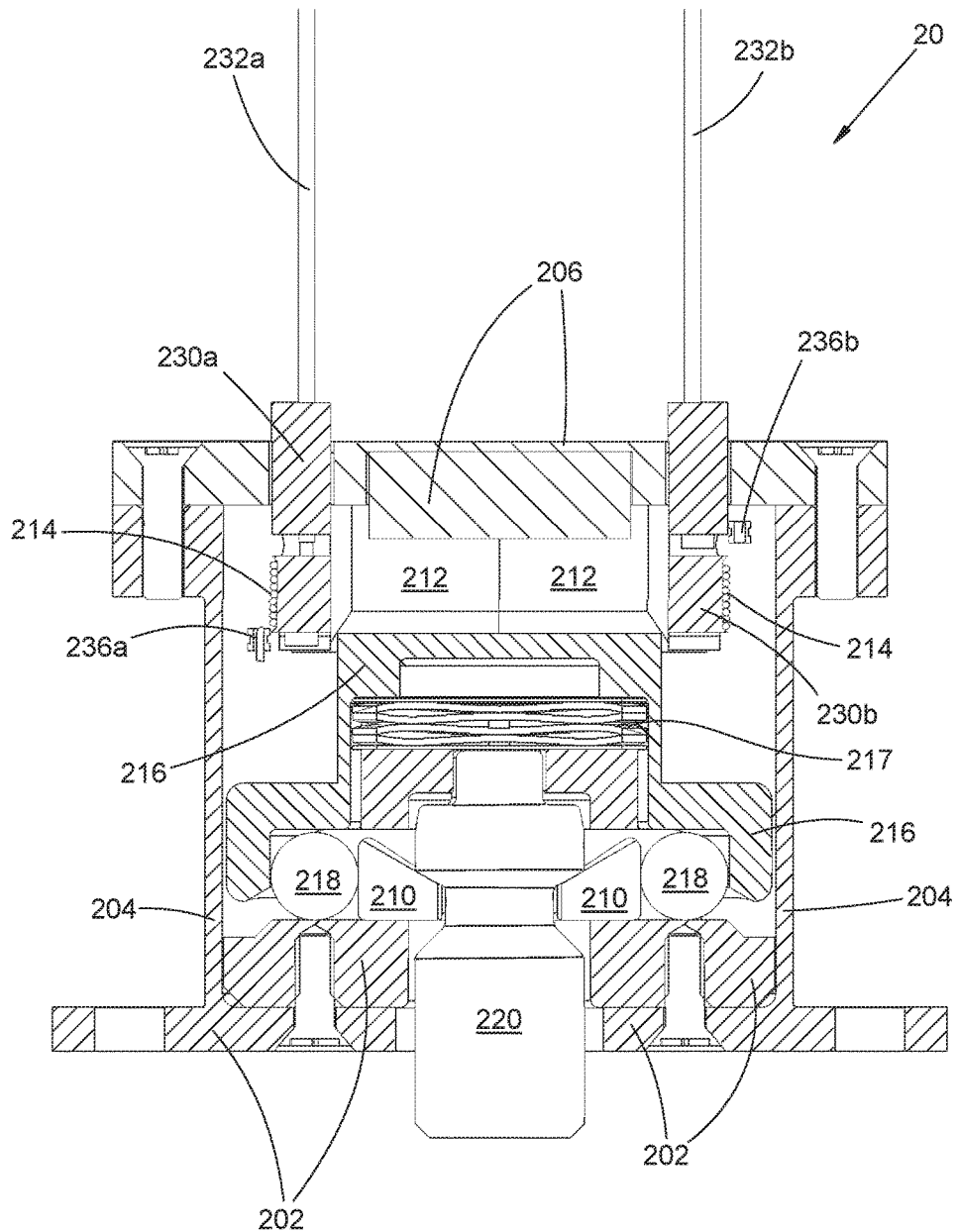
Figure 5C:
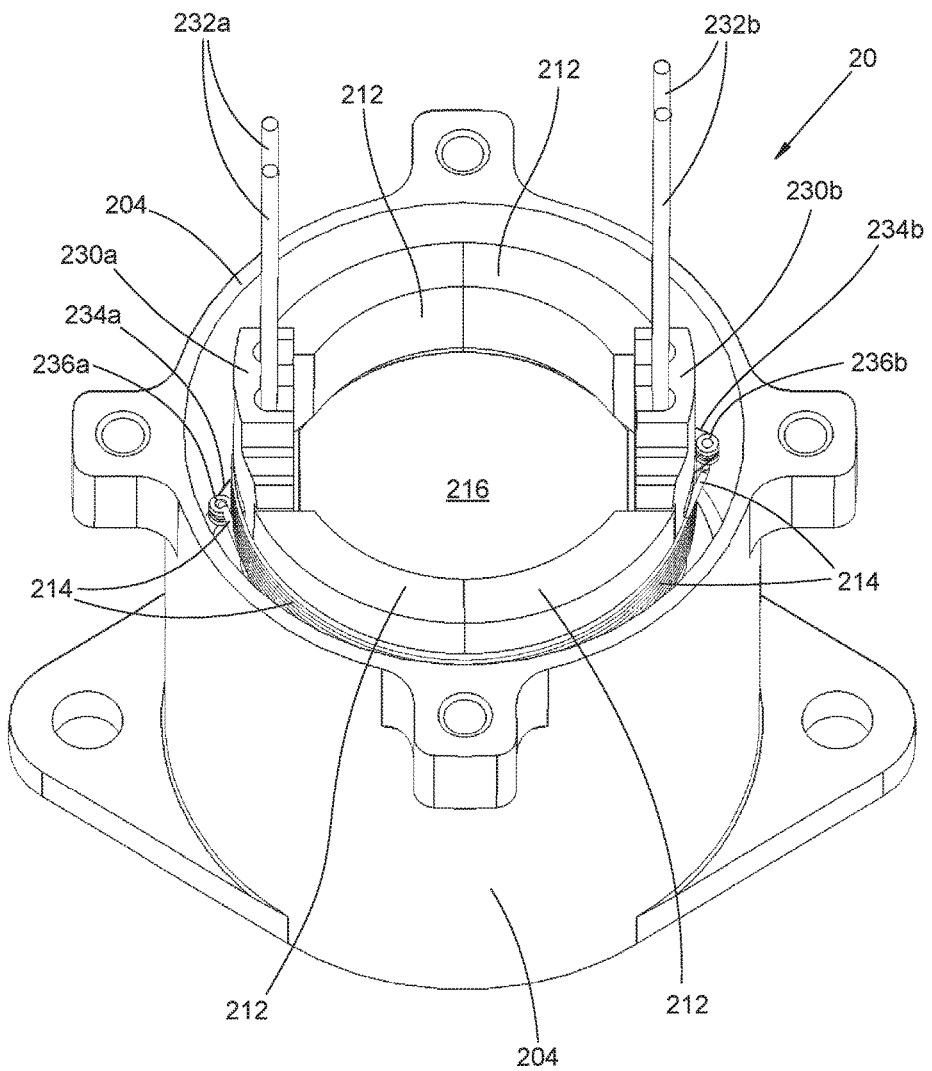
Figure 6A:
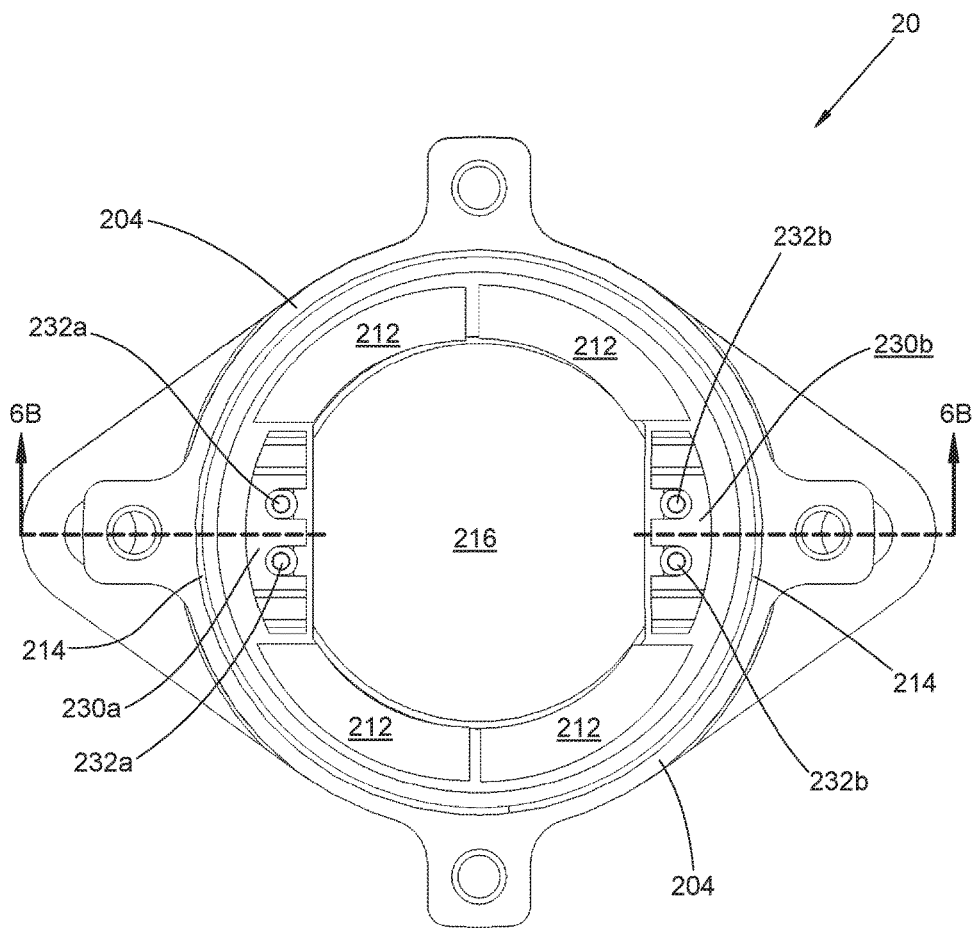
FIGS. 6A, 6B, and 6C are top, side cross-sectional, and perspective views of the second example of the inventive release apparatus after breaking of one or more fuse wires, loosening of the restraining wire, and partial movement of one or more sleeve retainers.
Figure 6B:
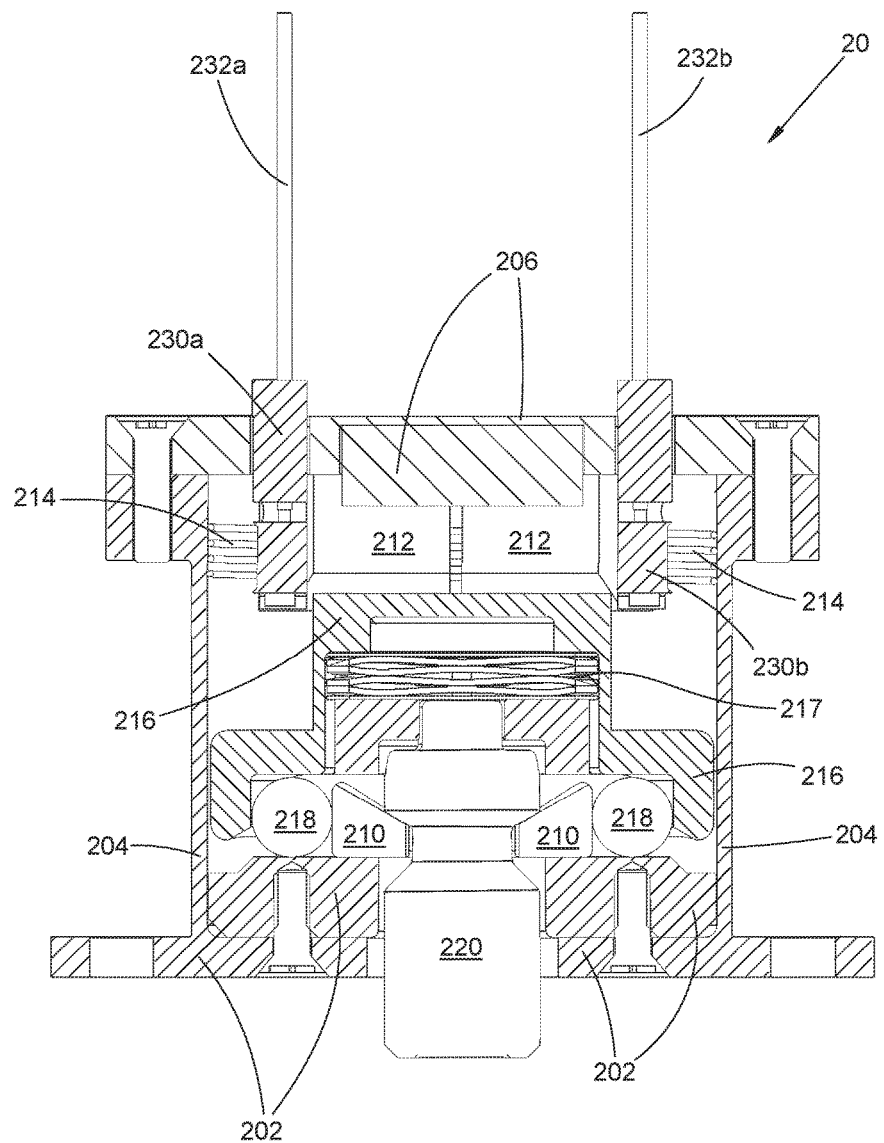
Figure 6C:
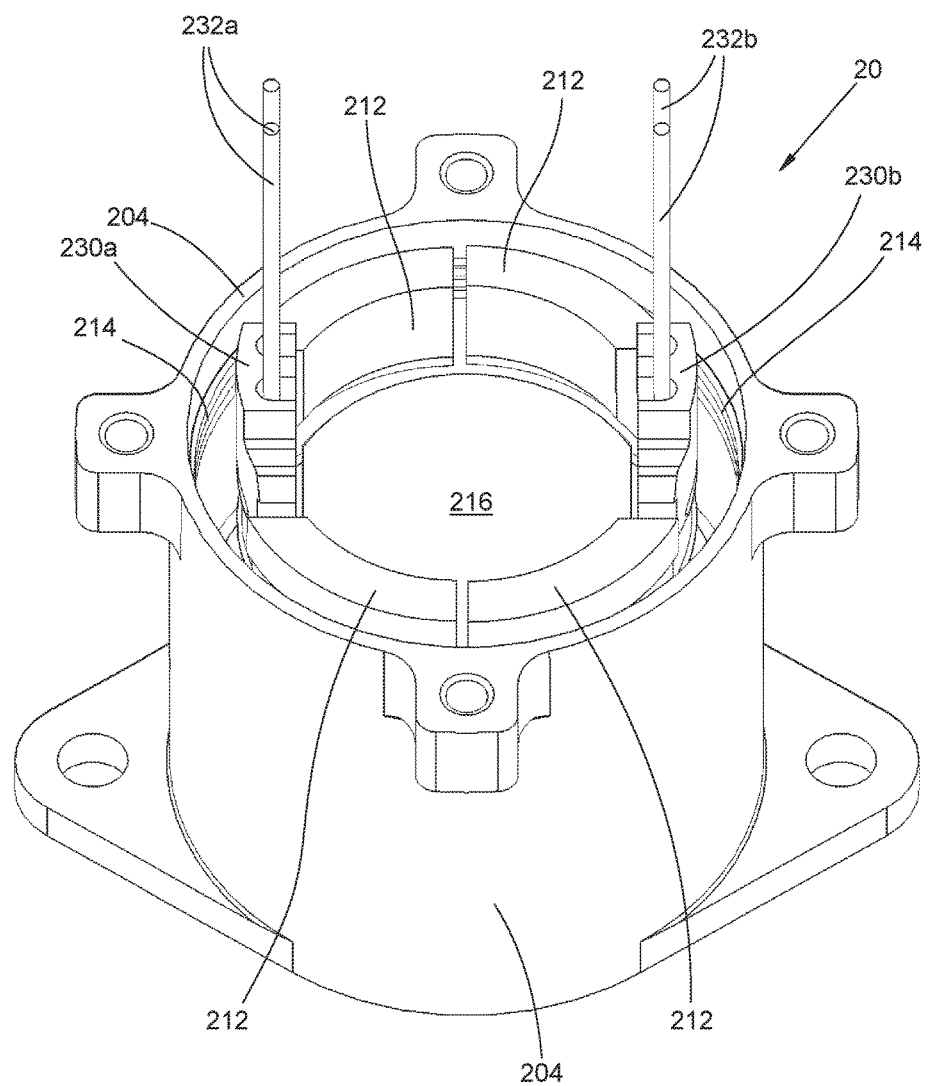
Figure 7A:
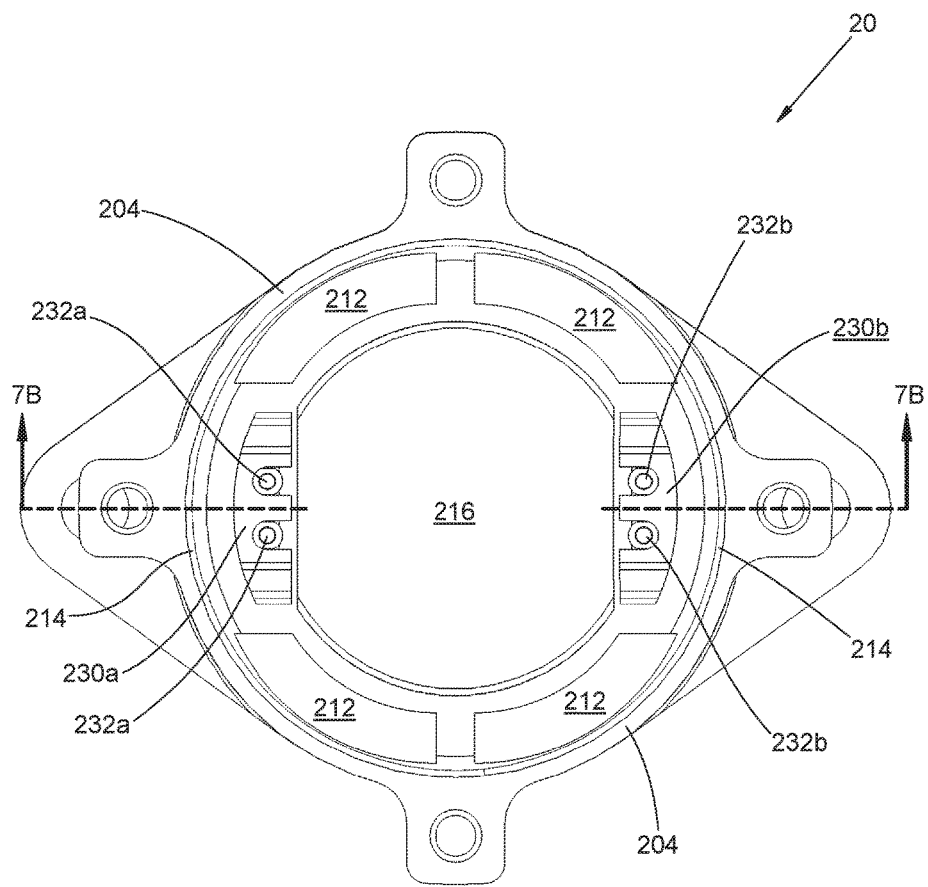
FIGS. 7A, 7B, and 7C are top, side cross-sectional, and perspective views of the second example of the inventive release apparatus after full movement of one or more sleeve retainers, the retention sleeve, one or more rolling bearing elements, and one or more retention members.
Figure 7B:
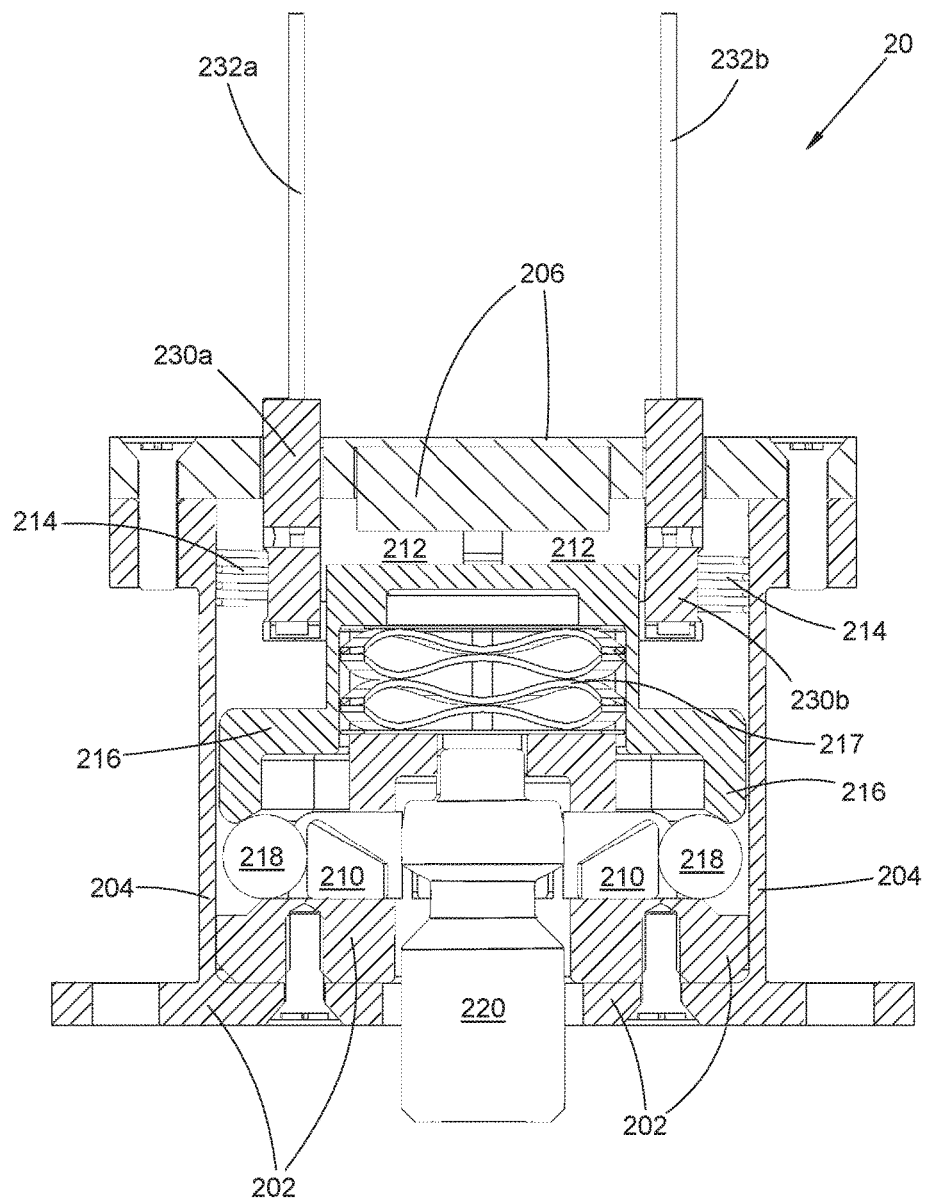
Figure 7C:
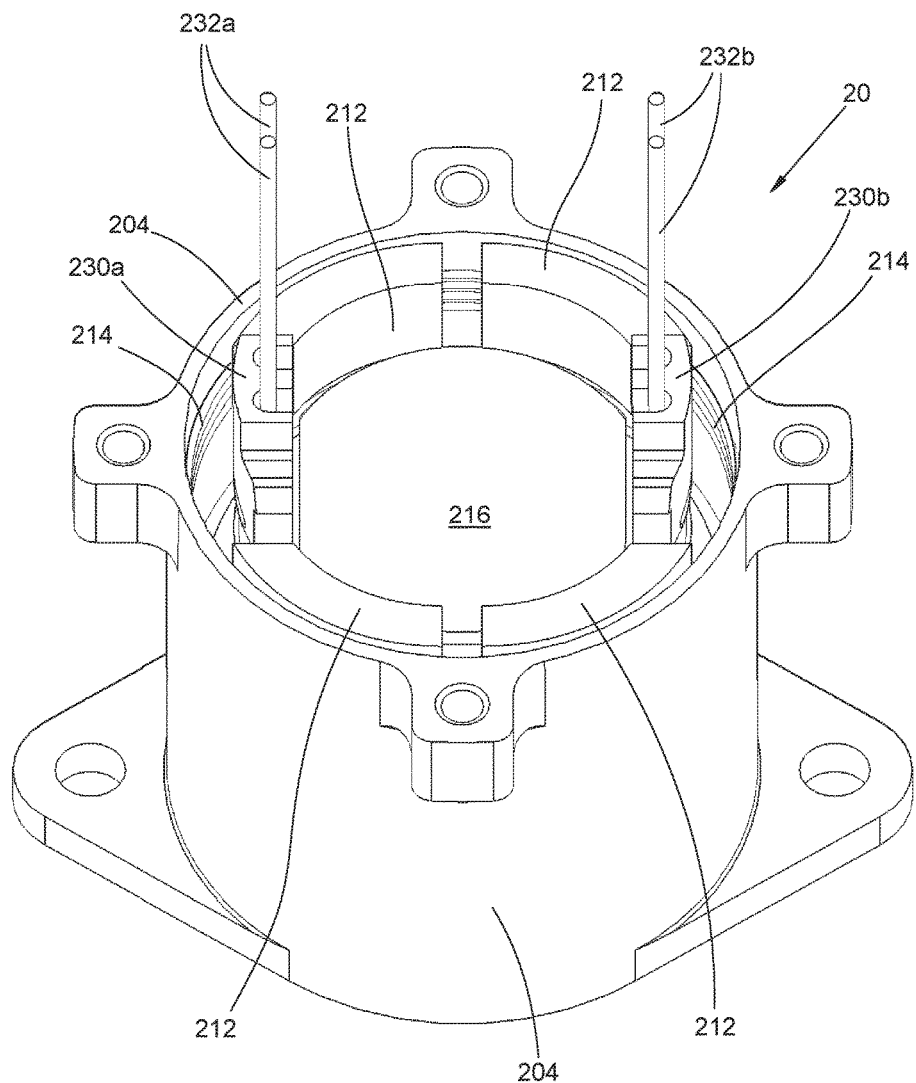
Figure 8A:
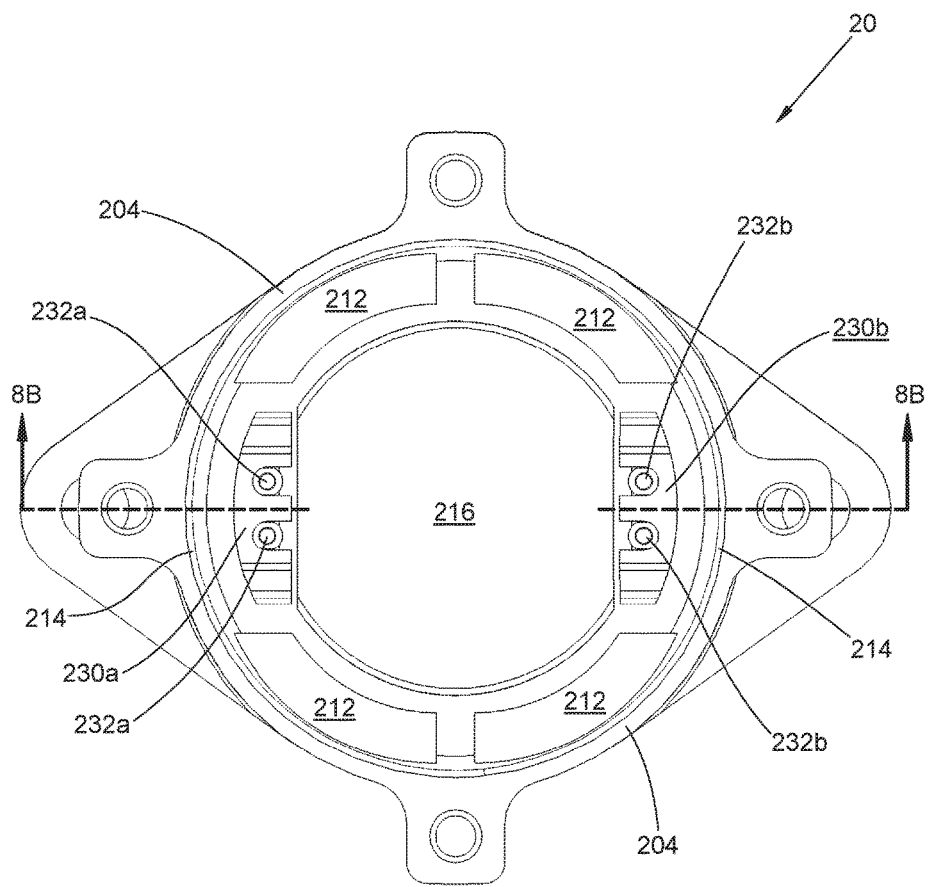
FIGS. 8A, 8B, and 8C are top, side cross-sectional, and perspective views of the second example of the inventive release apparatus in a released condition.
Figure 8B:
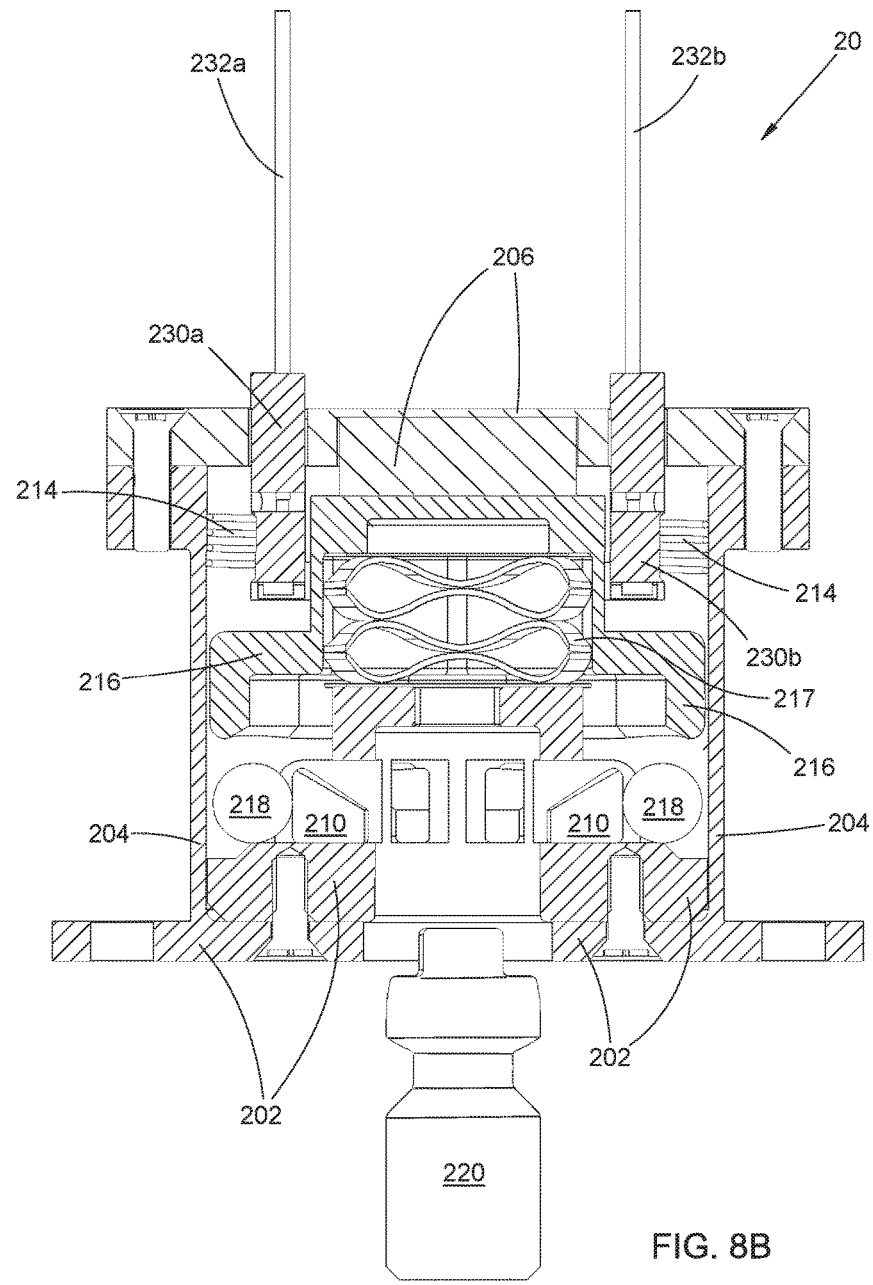
Figure 8C:
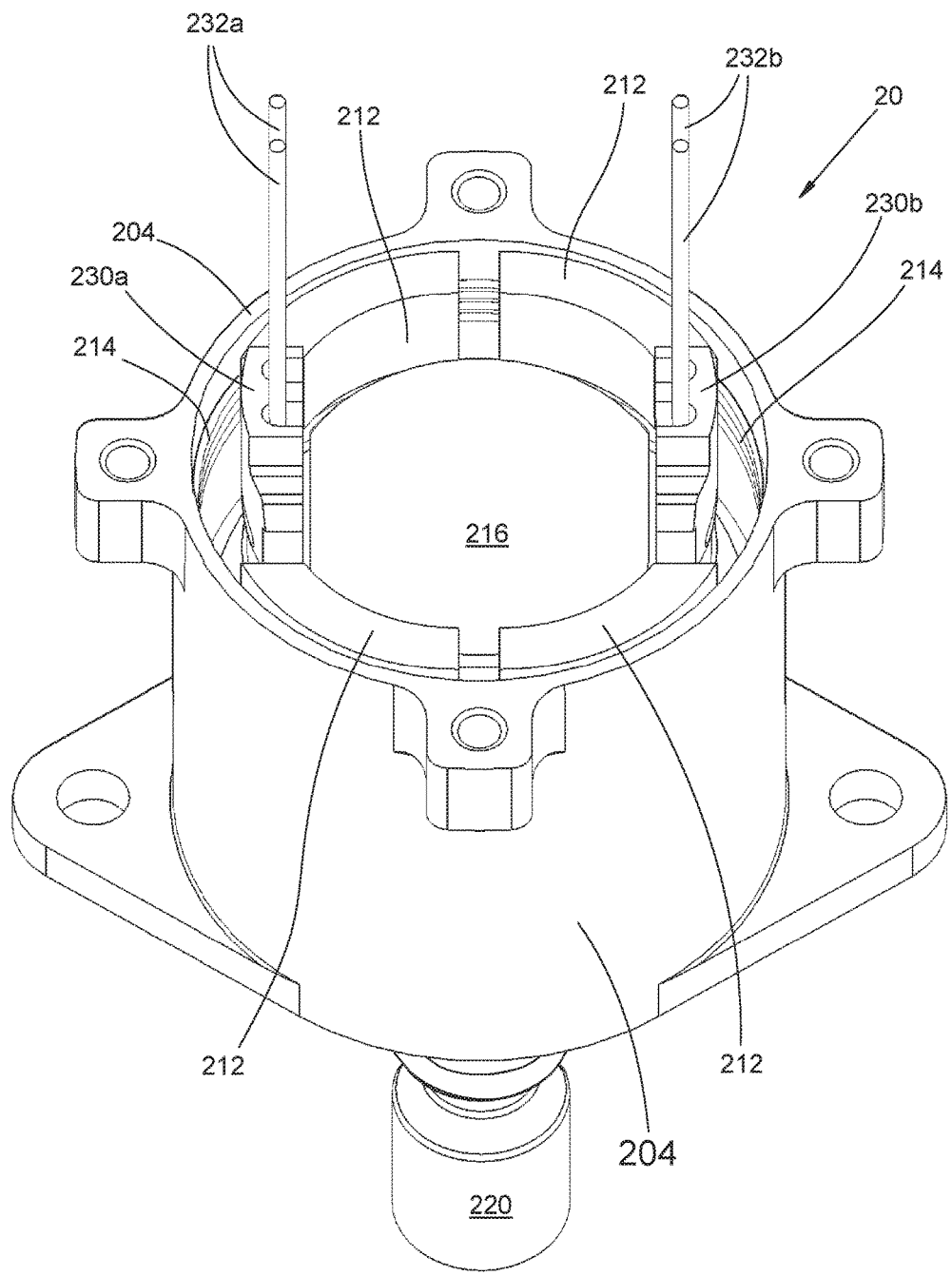

The restraining wire 114 is held in the tightened coil arrangement, against the coil bias force including any indirect load force, by the first fuse wire 134a holding a first end of the restraining wire 114 and by the second fuse wire 134b holding a second end of the restraining wire 114 (as in FIGS. 1A-1C). The multiple coils of the restraining wire 114 reduce the holding force needed to be exerted by the fuse wires 134a/134b to hold the restraining wire 114 in the tightened coil arrangement, e.g., according to the capstan equation or applicable variant thereof. Any suitable one or more strong electrically conductive materials can be employed for the first and second fuse wires 134a/134b. Stainless steel is commonly employed. The first isolation member 136a serves as a mechanical link between the first end of the restraining wire 114 and the first fuse wire 134a, and electrically insulates the first fuse wire 134a from the restraining wire 114. Similarly, the second isolation member 136b serves as a mechanical link between the second end of the restraining wire 114 and the second fuse wire 134b, and electrically insulates the second fuse wire 134b from the restraining wire 114. The isolation members 136a/136b can comprise any one or more suitably rigid and strong electrically insulating materials. One or more ceramic materials are commonly employed.

The restraining wire 114, fuse wires 134a/134b, and the isolation members 136a/136b can be arranged in any suitable way to effect mechanical coupling between the fuse wires 134a/134b and the restraining wire 114. In the examples shown, the isolation members 136a/136b are ceramic cylinders with an axial hole and a circumferential groove or slot. The first end of the restraining wire 114 is received in the hole in the first isolation member 136a; the second end of the restraining wire 114 is similarly received in the hole in the second isolation member 136b. The first fuse wire 134a is received in the groove of the first isolation member 136a; the second fuse wire 134b is similarly received in the groove of the second isolation member 136b. The first fuse wire 134a is arranged in a "U" or "V" shape with the first isolation member 136a positioned against the base (i.e., the central portion of the "U" or "V") between opposite side portions of the U- or V-shaped first fuse wire 134a; the second fuse wire 134b is similarly arranged in a "U" or "V" shape with the second isolation member 136b positioned against the base between opposite side portions of the U- or V-shaped second fuse wire 134b. The "U" or "V" shape of the fuse wires 134a/134b effectively doubles their holding strength, allowing thinner wire to be employed and smaller actuation currents to break them when the release apparatus 10 is activated.

With the release apparatus 20 in a so-called fastened or retained condition (as in FIGS. 1A-1C), (i) the release member 120 is in the retained position, (ii) the one or more retention members 110 are in the corresponding retention position(s), (iii) the restraining wire 114 is held in the tightened coil arrangement by the fuse wires 134a/134b. With the release apparatus in a so-called actuated or released condition (as in FIGS. 4A-4C), (i) one or both fuse wires 134a/134b are broken, (ii) the restraining wire 114 is in the loosened coil arrangement, (iii) the retention member(s) 110 are in the corresponding release position(s), and (iv) the release member 120 is outside the housing in the surrounding volume. Activation or actuation of the release apparatus 10 results in the apparatus making a transition from the retained condition to the released condition, and is initiated by flowing electrical actuation current through one or both of the fuse wires 134a/134b.

With a first electrical actuation current flowing through the first fuse wire 134a, the coil bias force (including any indirect load force) is sufficient to break the first fuse wire 134a (which could even break as a result of its own internal strains when the actuation current flow heats it up); similarly, with a second electrical actuation current flowing through the second fuse wire 134b, the coil bias force (including any indirect load force) is sufficient to break the second fuse wire 134b. Stainless steel fuse wires between about 0.1 mm and about 0.2 mm thick are typically employed; other suitable wire material or thickness can be employed. At the typical thicknesses, the electrical actuation current needed to cause breakage of the fuse wire typically is between about 2 A and about 3 A; any suitable actuation current level can be employed that causes the fuse wire to break, and typically depends on the choice of wire thickness and material. The restraining wire 114 is arranged so that breakage of only the first fuse wire 134a, breakage of only the second fuse wire 134b, or breakage of both the first and second fuse wires 134a/134b is sufficient to enable (i) movement of the restraining wire 114 from the tightened coil arrangement to the loosened coil arrangement in response to the coil bias force (including indirect load force(s), if any), (ii) movement of the one or more retention members 110 from the corresponding retention position(s) to the corresponding release position(s), and (iii) movement of the release member 120 from the retained position to the exterior space. Initiating flow of one or both of those actuation currents therefore acts to trigger or activate the release apparatus 10 to make the transition from the retained condition to the released condition. That redundancy (i.e., having a breakable fuse wire at both ends of the coiled restraining wire) is one inventive feature of the disclosed release apparatus. If for any reason only one of the fuse wires 134a/134b breaks, the release apparatus 10 will still function properly and allow the release member 120 to move out of the housing into the surrounding volume (i.e., the release apparatus 10 will still make the transition from the retained condition to the released condition).

The release apparatus 10 can further include first and second electrically insulating fuse wire retainers 130a/130b and first and second pairs of lead wires 132a/132b. Any one or more suitably rigid and strong insulating materials can be employed to form the fuse wire retainers 130a/130b; in some examples, the fuse wire retainers are formed from Torlon®. The first fuse wire 134a is connected to a source of the first actuation current by the first pair of lead wires 132a; the second fuse wire 134b is similarly connected to a source of the second actuation current by the second pair of lead wires 132b. The first fuse wire 134a and the first pair of lead wires 132a are held in place by the first fuse wire retainer 130a, which insulates the first fuse wire 134a from the housing; the second fuse wire 134b and the second pair of lead wires 132b are similarly held in place by the second fuse wire retainer 130b, which insulates the second fuse wire 134b from the housing. The respective sources of the first and second actuation currents are independent of one another. For purposes of the present disclosure and appended claims, two current sources are "independent" if there are no electrically conductive pathways between them at all (preferred), or, if such a pathway exists, it is through only a common ground. The independence of the actuation current sources adds a second layer of redundancy in the inventive release apparatus 10. As already noted above, the presence of two fuse wires 134a/134b at opposite ends of the restraining wire 114 ensures that the release apparatus 10 can be actuated by breaking only one of those fuse wires. If both wires were connected to a common current source, however, a single electrical failure of that single current source would cause the release apparatus to fail, because neither fuse wire would be broken. In the inventive release apparatus 10 with two independent sources of actuation current, each separately connected to only one of the fuse wires 134a/134b, a single electrical failure would at most prevent breakage of only one of the two fuse wires. The other fuse wire could still be broken, enabling movement of the release member 120 from the housing. If would take a far more unlikely failure of two independent actuation current sources for the release apparatus 10 to fail completely. Complete electrical isolation of the two independent actuation current sources from one another is preferred, with no electrically conductive pathway between them at all, so that an electrical short in one current source cannot affect the other. In some examples, however, the two independent actuation current sources might share a common ground as the only electrically conductive pathway between them.

Each of the fuse wire retainers 130a/130b is arranged to hold contact portions of the corresponding lead wires 132a/132b. Those contact portions can be of any suitable type or arrangement. In some examples, the contact portions are substantially rigid, electrically conductive, gold-plated contacts. To ensure reliable connections, each end of each fuse wire 134a/134b can be wound around a corresponding one of the contacts, welded or soldered to the corresponding contact (e.g., by resistance welding), or both.

The emphasis on reliability and redundancy in the release apparatus 10 is necessary because such devices are often employed in a satellite or other spacecraft that includes one or more deployable components that must be held down and then released remotely, with no human intervention possible if there is a failure or malfunction. A common use of the release apparatus 10 disclosed herein is to hold down a deployable component 98 of a satellite 99 or spacecraft in a non-deployed arrangement (e.g., as in FIG. 9A) during, e.g., launch, flight maneuvers, orbital insertion, or other situations in which such a non-deployed arrangement might be necessary or desirable. Examples of such deployable components can include one or more of, e.g., solar panels, solar sails, solar shades, antennae, instrument arrays, and so forth. It is often the case that the deployable component 98 is biased so that, upon release, it moves from the non-deployed arrangement to a deployed arrangement (e.g., as in FIG. 9B) in response to the deployment bias force. The release apparatus 10 can be attached to a satellite 99 or spacecraft by attachment of the housing, and the deployable component 98 is attached to the release member 120 of the hold-down release apparatus 10. Prior to release (e.g., as in FIG. 9A), with the release member 120 held in the retained position by the retention member(s) 110 (i.e., with the release apparatus 10 in the retained condition), the attachment to the release member 120 holds the deployable component 98 in its non-deployed arrangement against the deployment bias force. Upon activation of the release apparatus 10 (by flow of the first electrical actuation current through the first fuse wire 134a, by flow of the second actuation current through the second fuse wire 134b, or both), one or both of the fuse wires 134a/134b break, the restraining wire 114 moves to the loosened coil arrangement in response to the coil bias force, the one or more retention members 110 move to the corresponding release position(s), the release member 120 is allowed to move out of the housing. In other words, the release apparatus 10 make a transition to the release condition, and the deployable component 98 moves to its deployed configuration (taking the release member 120 along with it; e.g., as in FIG. 9B) in response to the deployment bias force. The actuation currents can be sent through the corresponding fuse wires simultaneously or sequentially. If sequentially, and if the first of the actuation currents causes its corresponding fuse wire to break and the deployable component 98 to deploy, the other actuation current optionally can be skipped-over or omitted.

In one specific example, solar panels 98 can be held by the hold-down release apparatus 10 (by attachment of the housing to the satellite 99 or spacecraft and attachment of the solar panels 98 to the release member 120 while the release apparatus 10 is in the retained condition) in a folded, non-deployed arrangement against a deployment bias force (provided by, e.g., spring-loaded hinges in the folded solar panels 98). When deployment (i.e., unfolding) of the solar panels 98 is desired, the first electrical actuation current is sent through the first fuse wire 134a, the second electrical actuation current is sent through the second fuse wire 134b, or both electrical actuation currents are sent through the corresponding fuse wires 134a/134b, in order to initiate a transition of the release apparatus 10 to the released condition. At least one of the fuse wires 134a/134b is broken, allowing the restraining wire 114 to move to the loosened coil arrangement, the retention member(s) 110 to move to the corresponding release position(s), and the release member 120 to leave the housing, pulled out by the deployment bias force on the solar panels 98, which then proceed to unfold in response to the deployment bias force.

The release apparatus 10 can be made by: (a) inserting the release member 120 into the housing in the retained position; (b) inserting the one or more retention members 110 into the housing in the corresponding retention position(s); (c) coiling the restraining wire 114 with the restraining wire in the tightened coil arrangement and the one or more retention members 110 in the corresponding retention position(s); and (d) arranging the first fuse wire 134a within the housing to hold the first end of the restraining wire 114 against the coil bias force and arranging the second fuse wire 134b within the housing to hold the second end of the restraining wire against the coil bias force. The release apparatus 10 thus made is in the retained condition. Further steps can include connecting the first fuse wire 134a to a source of the first actuation current, connecting the second fuse wire 134b to an independent source of the second actuation current, attaching the housing to a body of a satellite 99 or spacecraft, and attaching a deployable component 98 of the satellite 99 to the release member 120, with the release member 120 held in the retained position by the one or more retention members 110 and the deployable component 98 held in a non-deployed arrangement by the release member 120.

If activation of the release apparatus 10 by one or both electrical actuation currents occurs after the satellite or spacecraft has been launched, and the release apparatus makes the transition to the release condition, then the release apparatus 10 has reached the end of its useful life. However, deployable satellite or spacecraft components and the release apparatus 10 typically undergo extensive pre-launch ground testing, during which the release apparatus 10 is repeatedly activated (with or without being attached to the satellite, spacecraft, or deployable component). It is desirable for the release apparatus 10 to be readily repaired, refurbished, or reset for reuse after such test activation (i.e., to make a transition from the released condition back to the retained condition). To accomplish this, after breakage of the first or second fuse wire 134a/134b: (i) the release member 120 is reinserted into the housing in the retained position and the retention member(s) 110 are moved into the corresponding retention position(s); and (ii) one or more of the restraining wire 114, the first or second fuse wires 134a/134b, or the first or second isolation members 136a/136b are replaced. One or both pairs of lead wires 132a/132b can also be replaced; if present, one or both of the fuse wire retainers 130a/130b or one or more secondary retention members 112 can be replaced as well. Typically, the cover 106 of the housing is removed to provide access to the interior. After the replacement, (i) the restraining wire 114 is arranged in the tightened coil arrangement, (ii) the first fuse wire 134a is arranged within the housing to hold the first end of the restraining wire 114 against the coil bias force, (iii) the second fuse wire 134b is arranged within the housing to hold the second end of the restraining wire 114 against the coil bias force, (iv) the first isolation member 136a is arranged so as to insulate electrically the first end of the restraining wire 114 from the first fuse wire 134a, and (v) the second isolation member 136b is arranged so as to insulate electrically the second end of the restraining wire 114 from the second fuse wire 134b. In other words, the release apparatus is returned to its initial retained condition with the release member 120 held in its retained position, and the release apparatus 10 is ready to be activated again by one or both actuation currents to permit the release member 120 to move out of the housing again.

A second example of a hold-down release apparatus 20 is shown in FIGS. 5A-5C, 6A-6C, 7A-7C, and 8A-8C. The example release apparatus 20 comprises a housing (including a base 202, lateral housing 204, and a top cover 206, which can be discrete parts or integrally formed in any suitable combination), a release member 220, one or more retention members 210, a retention sleeve 216, one or more rolling bearing elements 218, one or more sleeve retainers 212, a restraining wire 214, and one or more fuse wires 234a/234b. Each retention member 210 is movable within the housing between a corresponding retention position and a corresponding release position. With each retention member 210 in the corresponding release position (as in FIGS. 7A-7C and 8A-8C), the release member 220 is moveable from a retained position at least partly within the housing (as in FIGS. 7A-7C) to an exterior space outside the housing (as in FIGS. 8A-8C). With each retention member 210 in the corresponding retention position(s) (as in FIGS. 5A-5C and 6A-6C), the retention member(s) 210 obstruct movement of the release member 220 from the retained position to the exterior space. Suitable variations of materials, shapes, arrangements, and engagement of the release member 220, the retention member(s) 210, and the housing 202/204/206 are similar to those described above for the release member 120, the retention member(s) 110, and the housing 102/104/106, and need not be repeated.

The retention sleeve 216 is moveable between an engaged sleeve position (as in FIGS. 5A-5C and 6A-6C) and a disengaged sleeve position (as in FIGS. 7A-7C and 8A-8C), and is biased toward the disengaged sleeve position by a sleeve bias force (provided by the compression spring 217 in this example; any suitable source of a bias force can be employed). In the engaged sleeve position, the retention sleeve 216 obstructs movement of each retention member 210 from the corresponding retention position(s) to the corresponding release position(s). In the disengaged sleeve position, the retention sleeve 216 permits movement of each retention member 210 from the corresponding retention position to the corresponding release position. Each rolling bearing element 218 is positioned between the retention sleeve 216 and a corresponding one of the retention member(s) 210, and is arranged so as to reduce friction opposing movement of the retention sleeve 216 from the engaged position to the disengaged position. Any one or more suitably rigid and strong materials can be employed to form the retention sleeve 216 and the rolling bearing elements 218; stainless steel is commonly employed. In some examples, the inner surface of the retention sleeve is polygonal (hexagonal in the example shown) and there is a corresponding retention member 210 for each face of the polygonal inner surface (six retention members 210 in the example shown). Between each face and the corresponding retention member 210 is a corresponding cylindrical rolling bearing element 218. Other numbers of faces, retention members 210, and cylindrical rolling bearing elements 218 can be employed. Other types or arrangements of rolling bearing elements 218 (e.g., spherical bearing elements), and corresponding structural features or adaptations of the inner surface of the retention sleeve 216 or retention member(s) 210 (e.g., bearing raceways, grooves, journals, and so forth) can be employed.

Each sleeve retainer 212 is moveable between a corresponding sleeve-retention position (as in FIGS. 5A-5C) and a corresponding sleeve-release position (as in FIGS. 7A-7B and 8A-8C). In the corresponding sleeve-retention position(s), each sleeve retainer 212 obstructs movement of the retention sleeve 216 from the engaged position to the disengaged position; in the corresponding sleeve-release position(s), each sleeve retainer 212 permits movement of the retention sleeve 216 from the engaged position to the disengaged position. The restraining wire 214 forms multiple coils around the one or more sleeve retainers 212, and is moveable between a tightened coil arrangement (as in FIGS. 5A-5C) and a loosened coil arrangement (as in FIGS. 6A-6C, 7A-7C, and 8A-8C). The restraining wire 214 is biased toward the loosened coil arrangement by a coil bias force. In the tightened coil arrangement, the restraining wire 214 obstructs movement of the one or more sleeve retainers 212 from the corresponding sleeve-retention position(s) to the corresponding sleeve-release position(s); in the loosened coil arrangement, the restraining wire 214 permits movement of the one or more sleeve retainers 212 from the corresponding sleeve-retention position(s) to the corresponding sleeve-release position(s). Variations of materials, shapes, and arrangements of the sleeve retainer(s) 212 and the restraining wire 214 are similar to those described above for the secondary retention member(s) 112 and the restraining wire 114, and need not be repeated.

A first end of the restraining wire 214 is held by a first fuse wire 234a among the one or more fuse wires, and thereby holds the restraining wire 214 in the tightened coil arrangement against the coil bias force. With a first electrical actuation current flowing through the first fuse wire 234a, the coil bias force is sufficient to break the first one of the one or more fuse wires. That breakage of at least the first fuse wire 234a enables (i) movement of the restraining wire 214 from the tightened coil arrangement to the loosened coil arrangement in response to the coil bias force, (ii) movement of each sleeve retainer 212 to the corresponding sleeve-release position, (iii) movement of the retention sleeve 216 from the engaged position to the disengaged position in response to the sleeve bias force, (iv) movement of each retention member 210 to the corresponding release position, and (v) movement of the release member 220 from the retained position to the exterior space. In other words, the release apparatus 20 makes a transition from a retained condition to a released condition. The first fuse wire 234a can be arranged and connected to the restraining wire 214 in any suitable way. In some examples, the other end of the restraining wire 214 can be secured to the housing or other fixed structure. In some other examples, it can be advantageous to employ two fuse wires 234a/234b at corresponding first and second ends of the restraining wire 214, and isolate the fuse wires 234a/234b from the restraining wire 214 using isolation members 236a/236b, in an arrangement similar to that described for the release apparatus 10. Variations of materials, shapes, and arrangements of the restraining wire 214, the fuse wires 234a/234b, the isolation members 236a/236b, the lead wires 232a/232b, the insulating fuse wire retainers 230a/230b, and corresponding independent actuation current sources are similar to those described above for the restraining wire 114, the fuse wires 134a/134b, the isolation members 136a/136b, the lead wires 132a/132b, the insulating fuse wire retainers 130a/130b, and the corresponding independent actuation current sources, including the redundancies described, and need not be repeated. Some of those variations can be employed if there is only one fuse wire 234a.

The arrangement of the retention sleeve 216 effectively decouples load forces on the release member 220 from the restraining wire 214 and the fuse wires 234a (and the second fuse wire 234b, if present). Outward forces on the retention member(s) 210 are borne by the rolling bearing element(s) 218 and the inner surface of the retention sleeve 216. The only load forces on the fuse wire(s) 234a/234b (other than any elastic restoring force of the restraining wire 214 itself) arise from transmission of a portion of the sleeve bias force, that often is substantially less than the load force on the release member 220. In addition, the engagement of the retention member(s) 210 and the retention sleeve 216 via the rolling bearing elements 218 reduces or nearly eliminates sliding friction between those elements, reducing the sleeve bias force needed to move the retention sleeve to the disengaged sleeve position when the release apparatus 20 is activated. That reduction in turn can allow thinner fuse wire(s) 234a/234b to be employed, because any portion of the sleeve bias force transmitted to the fuse wire(s) is can be correspondingly smaller. Thinner fuse wire(s) can allow smaller actuation currents to be employed.

As with the release apparatus 10, the housing of the release apparatus 20 can be attached to a body of a satellite 99 or spacecraft, and the release member 220 attached to a deployable component 98 of the satellite 99 or spacecraft. With the release member 220 held in the retained position by the retention member(s) 210 in the corresponding retention position(s) (i.e., with the release apparatus 20 in the retained condition), the release member 220 holds the deployable component 98 in a non-deployed arrangement (e.g., as in FIG. 9A); with the retention member(s) 210 in the corresponding release position(s) (i.e., with the release apparatus 20 in the released condition), movement of the release member 220 from the retained position to the exterior space enables movement of the deployed component 98 from the non-deployed arrangement into a deployed arrangement (e.g., as in FIG. 9B). That deployment is activated as in the previous example, by flowing the first actuation current through the fuse wire 234a, or flowing the second actuation current through the fuse wire 234b (if present). The resulting breakage of one or both fuse wire(s) enables (1) movement of the restraining wire 214 from the tightened coil arrangement to the loosened coil arrangement in response to the coil bias force, (2) movement of the sleeve retainer(s) 212 from the corresponding sleeve-retention position(s) to the corresponding sleeve-release position(s), (3) movement of the retention sleeve 216 from the engaged position to the disengaged position in response to the sleeve bias force, (4) movement of the retention member(s) 210 from the corresponding retention position(s) to the corresponding release position(s), and (5) movement of the release member 220 from the retained position to the exterior space. In other words, the release member 20 makes a transition from the retained condition to the released condition.

The release apparatus 20 can be made by: (a) inserting the release member 220 into the housing in the retained position; (b) inserting the retention member(s) 210 into the housing in the corresponding retention position(s); (c) positioning each rolling bearing element 218 against a corresponding retention member 210; (d) inserting the retention sleeve 216 into the housing in the engaged position and biasing the retention sleeve 216 toward the disengaged position; (e) coiling the restraining wire 214 around the sleeve retainer(s) 212 with the restraining wire 214 in the tightened coil arrangement and the sleeve retainer(s) 212 in the corresponding sleeve-retention position(s); (f) arranging at least a first fuse wire 234a to hold the first end of the restraining wire 214 against the coil bias force with the restraining wire 214 in the tightened coil arrangement; and (g) inserting the sleeve retainer(s) 212 into the housing in the corresponding sleeve-retaining position(s) and with the retention sleeve 216 in the engaged position. The release apparatus 20 thus made is in the retained condition. Further steps can include connecting the first fuse wire 234a to a source of the first actuation current, connecting the second fuse wire 234b (if present) to an independent source of the second actuation current, attaching the housing to a body of a satellite 99 or spacecraft, and attaching a deployable component 98 of the satellite 99 to the release member 220, with the release member 220 held in the retained position by the one or more retention members 210 and the deployable component 98 held in a non-deployed arrangement by the release member 220.

As with the previous example, it is desirable to enable the release apparatus 20 to be repaired, refurbished, or reset so that it can be reused after each test activation. To accomplish this, after breakage of the first fuse wire 234a (or the second fuse wire 234b, if present): (i) the release member 220 is reinserted into the housing in the retained position, the retention member(s) 210 are moved into the corresponding retention position(s), and the retention sleeve 216 is moved to the engaged sleeve position; and (ii) one or more of the restraining wire 214, the first or second fuse wires 234a/234b, or one or more of the sleeve retainers 212 are replaced. One or both pairs of lead wires 232a/232b can also be replaced; if present, one or both of the fuse wire retainers 230a/230b can be replaced as well. Typically, the cover 206 of the housing is removed to provide access to the interior. After the replacement, (i) the restraining wire 214 is arranged in the tightened coil arrangement, (ii) the fuse wire 234a is arranged within the housing to hold the first end of the restraining wire 214 against the coil bias force (and the fuse wire 234b, if present, is arranged within the housing to hold the second end of the restraining wire 214 against the coil bias force), and (iii) the one or more sleeve retainers 212 are arranged in the corresponding sleeve-retention position(s). In other words, the release apparatus 20 is returned to its initial retained condition with the release member 220 held in its retained position, and the release apparatus 20 is ready to be activated again by one or both actuation currents to permit the release member 220 to move out of the housing again.

In some examples, only some of the replaceable elements are replaced (e.g., only the broken fuse wires 234a or 234b or both), while other original elements are restored to their initial original arrangements (e.g., retightening the original restraining wire 214 to its tightened coil arrangement). More commonly, the restraining wire 214, the first fuse wire 234a (and the second fuse wire 234b, if present), and the first and second isolation members 236a/236b (if present) are all replaced together, often along with lead wires 232a (and 232b, if present) (and often any fuse wire retainers 230a or 230b and all of the sleeve retainers 212). In fact, in some examples it is advantageous to provide replacements for the fuse wire retainers 230a/230b, the lead wires 232a/232b, the fuse wires 234a/234b, the isolation members 236a/236b, the one or more sleeve retainers 212, and the restraining wire 214 (in its tightened coil arrangement) in a pre-assembled initiator assembly. The release apparatus 20 can be supplied with a set of multiple such pre-assembled initiator assemblies. Each time the release apparatus 20 is activated, the entire initiator assembly can be removed as a unit and, after reinserting the release member 220 into the housing in the retained position, moving the retention member(s) 210 to the corresponding retention position(s), and moving the retention sleeve 216 to the engaged sleeve position, an entire new initiator assembly can be inserted as a unit. Such a scheme greatly reduces time and effort required to repair, refurbish, or reset the release apparatus 20 for repeated use.

In addition to the preceding, the following examples fall within the scope of the present disclosure or appended claims:

Example 1

A hold-down release apparatus comprising a housing, a release member, one or more retention members, a restraining wire, first and second fuse wires, and first and second isolation members, wherein: (A) each one of the one or more retention members is movable within the housing between a corresponding retention position and a corresponding release position; (B) with each one of the one or more retention members in the corresponding release position, the release member is moveable from a retained position at least partly within the housing to an exterior space outside the housing; (C) with each one of the one or more retention members in the corresponding retention position, the one or more retention members obstruct movement of the release member from the retained position to the exterior space; (D) the restraining wire (i) forms multiple coils, (ii) is moveable between a tightened coil arrangement and a loosened coil arrangement, (iii) is biased toward the loosened coil arrangement by a coil bias force, (iv) in the tightened coil arrangement, obstructs movement of each one of the one or more retention members from the corresponding retention position to the corresponding release position, and (v) in the loosened coil arrangement, permits movement of each one of the one or more retention members from the corresponding retention position to the corresponding release position; (E) a first end of the restraining wire is held by the first fuse wire and a second end of the restraining wire is held by the second fuse wire, thereby holding the restraining wire in the tightened coil arrangement against the coil bias force; (F) the first end of the restraining wire is insulated electrically from the first fuse wire by the first isolation member, and the second end of the restraining wire is insulated electrically from the second fuse wire by the second isolation member; (G) with a first electrical actuation current flowing through the first fuse wire, the coil bias force is sufficient to break the first fuse wire, and with a second electrical actuation current flowing through the second fuse wire, the coil bias force is sufficient to break the second fuse wire; and (H) the restraining wire is arranged so that breakage of only the first fuse wire, breakage of only the second fuse wire, or breakage of both the first and second fuse wires is sufficient to enable (i) movement of the restraining wire from the tightened coil arrangement to the loosened coil arrangement in response to the coil bias force, (ii) movement of the one or more retention members from the corresponding retention positions to the corresponding release positions, and (iii) movement of the release member from the retained position to the exterior space.

Example 2

The release apparatus of Example 1 wherein the multiple coils formed by the restraining wire are positioned around the one or more retention members.

Example 3

The release apparatus of any one of Examples 1 or 2 further comprising one or more secondary retention members wherein: (i) each one of the one or more secondary retention members is movable within the housing between a corresponding secondary retention position and a corresponding secondary release position; (ii) with each one of the one or more secondary retention members in the corresponding secondary release position, the one or more retention members are moveable from the corresponding retention positions to the corresponding release positions (iii) with each one of the one or more secondary retention members in the corresponding secondary retention position, movement of the one or more retention members from the corresponding retention positions to the corresponding release positions is obstructed; (iv) the multiple coils formed by the restraining wire are positioned around at least one of the one or more secondary retention members; (v) with the restraining wire in the tightened coil arrangement, the restraining wire obstructs movement of the one or more secondary retention members from the corresponding secondary retention positions to the corresponding secondary release positions, thereby obstructing movement of the one or more retention members from the corresponding retention positions to the corresponding release positions; and (vi) with the restraining wire in the loosened coil arrangement, the restraining wire permits movement of the one or more secondary retention members from the corresponding secondary retention positions to the corresponding secondary release positions, thereby permitting movement of the one or more retention members from the corresponding retention positions to the corresponding release positions.

Example 4

The release apparatus of any one of Examples 1 through 3 further comprising first and second electrically insulating fuse wire retainers and first and second pairs of lead wires, wherein (i) the first fuse wire is connected to a source of the first actuation current by the first pair of lead wires, (ii) the first fuse wire and the first pair of lead wires are held in place by the first fuse wire retainer, (iii) the first fuse wire is insulated from the housing by the first fuse wire retainer, (iv) the second fuse wire is connected to a source of the second actuation current by the second pair of lead wires, (v) the second fuse wire and the second pair of lead wires are held in place by the second fuse wire retainer, (vi) the second fuse wire is insulated from the housing by the second fuse wire retainer, and (vii) the respective sources of the first and second actuation currents are independent of one another.

Example 5

The release apparatus of Example 4 wherein (i) each end of the first fuse wire is wound around a contact portion of a corresponding one of the first pair of lead wires and (ii) each end of the second fuse wire is wound around a contact portion of a corresponding one of the second pair of lead wires.

Example 6

The release apparatus of any one of Examples 4 or 5 wherein (i) each end of the first fuse wire is welded or soldered to a contact portion of a corresponding one of the first pair of lead wires and (ii) each end of the second fuse wire is welded or soldered to a contact portion of a corresponding one of the second pair of lead wires.

Example 7

The release apparatus of any one of Examples 1 through 6 wherein each isolation member comprises one or more ceramic materials.

Example 8

The release apparatus of any one of Examples 1 through 7 wherein the first fuse wire is received in a groove or slot of the first isolation member, and the second fuse wire is received in a groove or slot of the second isolation member.

Example 9

The release apparatus of any one of Examples 1 through 8 wherein, with the restraining wire held in the tightened coil arrangement by the first and second fuse wires, (i) the first fuse wire is arranged in a "U" or "V" shape with the first isolation member positioned against a central portion of the U- or V-shaped first fuse wire between opposite side portions of the U- or V-shaped first fuse wire, and (ii) the second fuse wire is arranged in a "U" or "V" shape with the second isolation member positioned against a central portion of the U- or V-shaped second fuse wire between opposite side portions of the U- or V-shaped second fuse wire.

Example 10

The release apparatus of any one of Examples 1 through 9 wherein the first end of the restraining wire is received in a hole in the first isolation member, and the second end of the restraining wire is received in a hole in the second isolation member.

Example 11

The release apparatus of any one of Examples 1 through 10 wherein, with the release member in the retained position and the one or more retention members in the corresponding retention positions, an oblique engagement surface of each one of the one or more retention members engages a corresponding oblique engagement surface of the release member, so that a load force on the release member biasing the release member away from the retained position results in a transmitted force biasing the one or more retention members toward the corresponding release positions.

Example 12

The release apparatus of any one of Examples 1 through 11 further comprising one or more bias members, wherein each one of the one or more bias members is arranged so as to bias movement of a corresponding one of the one or more retention members toward the corresponding release position.

Example 13

The release apparatus of any one of Examples 1 through 12 wherein movement of the one or more retention members toward the corresponding release positions is substantially perpendicular to movement of the release member from the retained position to the exterior space.

Example 14

The release apparatus of any one of Examples 1 through 13 wherein the release member includes a threaded portion arranged for engaging a deployable component.

Example 15

The release apparatus of any one of Examples 1 through 14 wherein, with the release member in the retained position, the release member engages a portion of the housing so as to obstruct rotation of the release member about an axis substantially parallel to movement of the release member from the retained position to the exterior space.

Example 16

The release apparatus of any one of Examples 1 through 15 wherein a portion of the housing is arranged so as to constrain movement of each one of the one or more retention members to substantially radial movement between the corresponding retention and release positions.

Example 17

The release apparatus of any one of Examples 1 through 16 wherein the restraining wire comprises stainless steel.

Example 18

The release apparatus of any one of Examples 1 through 17 wherein the first and second fuse wires comprise stainless steel.

Example 19

The release apparatus of any one of Examples 1 through 18 wherein the one or more fuse wires are between about 0.1 mm and about 0.2 mm in thickness.

Example 20

The release apparatus of any one of Examples 1 through 19 wherein the electrical actuation current is between about 2 A and about 3 A.

Example 21

The release apparatus of any one of Examples 1 through 20 wherein (i) the housing is attached to a body of a satellite, (ii) the release member is attached to a deployable component of the satellite, (iii) with the release member held in the retained position by the one or more retention members in the corresponding retention positions, the release member holds the deployable component in a non-deployed arrangement, and (iv) with the one or more retention members in the corresponding release positions, movement of the release member from the retained position to the exterior space enables movement of the deployed component from the non-deployed arrangement to a deployed arrangement.

Example 22

A method for using the release apparatus of Example 21, the method comprising (a) flowing the first actuation current through the first fuse wire so as to cause breakage of the first fuse wire or (b) flowing the second actuation current through the second fuse first wire so as to cause breakage of the second fuse wire, thereby enabling (1) movement of the restraining wire from the tightened coil arrangement to the loosened coil arrangement in response to the coil bias force, (2) movement of the one or more retention members from the corresponding retention positions to the corresponding release positions, and (3) movement of the release member from the retained position to the exterior space.

Example 23

A method for making the release apparatus of any one of Examples 1 through 21, the method comprising: (a) inserting the release member into the housing in the retained position; (b) inserting the one or more retention members into the housing in the corresponding retention positions; (c) coiling the restraining wire with the restraining wire in the tightened coil arrangement and the one or more retention members in the corresponding retention positions; (d) arranging the first fuse wire within the housing to hold the first end of the restraining wire against the coil bias force and arranging the second fuse wire within the housing to hold the second end of the restraining wire against the coil bias force; and (e) connecting the first fuse wire to a source of the first actuation current and connecting the second fuse wire to a source of the second actuation current, wherein the respective sources of the first and second actuation currents are independent of one another.

Example 24

The method of Example 23 further comprising attaching the housing to a body of a satellite and attaching a deployable component of the satellite to the release member, wherein (1) with the release member held in the retained position by the one or more retention members in the corresponding retention positions, the release member holds the deployable component in a non-deployed arrangement, and (2) with the one or more retention members in the corresponding release positions, movement of the release member from the retained position to the exterior space enables movement of the deployed component from the non-deployed arrangement into a deployed arrangement.

Example 25

A method for using the release apparatus of any one of Examples 1 through 21, the method comprising (a) flowing the first actuation current through the first fuse wire so as to cause breakage of the first fuse wire, or (b) flowing the second actuation current through the second fuse wire so as to cause breakage of the second fuse wire, thereby enabling (1) movement of the restraining wire from the tightened coil arrangement to the loosened coil arrangement in response to the coil bias force, (2) movement of the one or more retention members from the corresponding retention positions to the corresponding release positions, and (3) movement of the release member from the retained position to the exterior space.

Example 26

A method for repairing, refurbishing, or resetting the release apparatus of any one of Examples 1 through 21 after breakage of at least the first one of the one or more fuse wires, the method comprising: (a) reinserting the release member into the housing in the retained position and moving the one or more retention members into the corresponding retention positions; and (b) replacing one or more of the restraining wire, the first or second fuse wires, or the first or second isolation members, (c) wherein, after the replacement of part (b), (i) the restraining wire is arranged in the tightened coil arrangement, (ii) the first fuse wire is arranged within the housing to hold the first end of the restraining wire against the coil bias force, (iii) the second fuse wire is arranged within the housing to hold the second end of the restraining wire against the coil bias force, (iv) the first isolation member is arranged so as to insulate electrically the first end of the restraining wire from the first fuse wire, and (v) the second isolation member is arranged so as to insulate electrically the second end of the restraining wire from the second fuse wire.

Example 27

A method for repairing, refurbishing, or resetting the release apparatus of any one of Examples 1 through 21 after breakage of at least the first one of the one or more fuse wires, the method comprising: (a) reinserting the release member into the housing in the retained position and moving the one or more retention members into the corresponding retention positions; and (b) replacing the restraining wire, the first and second fuse wires, and the first and second isolation members, (c) wherein, after the replacement of part (b), (i) the restraining wire is arranged in the tightened coil arrangement, (ii) the first fuse wire is arranged within the housing to hold the first end of the restraining wire against the coil bias force, (iii) the second fuse wire is arranged within the housing to hold the second end of the restraining wire against the coil bias force, (iv) the first isolation member is arranged so as to insulate electrically the first end of the restraining wire from the first fuse wire, and (v) the second isolation member is arranged so as to insulate electrically the second end of the restraining wire from the second fuse wire.

Example 28

The method of Example 27 wherein, for the replacement of part (b), the restraining wire, the first and second fuse wires, and the first and second isolation members are arranged in a pre-assembled initiator assembly.

Example 29

A hold-down release apparatus comprising a housing, a release member, one or more retention members, a retention sleeve, one or more rolling bearing elements, one or more sleeve retainers, a restraining wire, and one or more fuse wires, wherein: (A) each one of the one or more retention members is movable within the housing between a corresponding retention position and a corresponding release position; (B) with each one of the one or more retention members in the corresponding release position, the release member is moveable from a retained position at least partly within the housing to an exterior space outside the housing; (C) with each one of the one or more retention members in the corresponding retention position, the one or more retention members obstruct movement of the release member from the retained position to the exterior space; (D) the retention sleeve (i) is moveable between an engaged sleeve position and a disengaged sleeve position, (ii) is biased toward the disengaged sleeve position by a sleeve bias force, (iii) in the engaged sleeve position, obstructs movement of each one of the retention members from the corresponding retention position to the corresponding release position, and (iv) in the disengaged sleeve position, permits movement of each one of the retention members from the corresponding retention position to the corresponding release position; (E) each one of the rolling bearing elements is positioned between the retention sleeve and a corresponding one of the retention members, and is arranged so as to reduce friction opposing movement of the retention sleeve from the engaged position to the disengaged position; (F) each one of the one or more sleeve retainers (i) is moveable between a corresponding sleeve-retention position and a corresponding sleeve-release position, (ii) in the corresponding sleeve-retention position, obstructs movement of the retention sleeve from the engaged position to the disengaged position, and (iii) in the corresponding sleeve-release position, permits movement of the retention sleeve from the engaged position to the disengaged position; (G) the restraining wire (i) forms multiple coils around the one or more sleeve retainers, (ii) is moveable between a tightened coil arrangement and a loosened coil arrangement, (iii) is biased toward the loosened coil arrangement by a coil bias force, (iv) in the tightened coil arrangement, obstructs movement of each one of the one or more sleeve retainers from the corresponding sleeve-retention position to the corresponding sleeve-release position, and (v) in the loosened coil arrangement, permits movement of each one of the one or more sleeve retainers from the corresponding sleeve-retention position to the corresponding sleeve-release position; (H) a first end of the restraining wire is held by a first one of the one or more fuse wires, thereby holding the restraining wire in the tightened coil arrangement against the coil bias force, and with a first electrical actuation current flowing through the first one of the one or more fuse wires, the coil bias force is sufficient to break the first one of the one or more fuse wires; (I) breakage of at least the first one of the one or more fuse wires enables (i) movement of the restraining wire from the tightened coil arrangement to the loosened coil arrangement in response to the coil bias force, (ii) movement of each one of the one or more sleeve retainers to the corresponding sleeve-release position, (iii) movement of the retention sleeve from the engaged position to the disengaged position in response to the sleeve bias force, (iv) movement of each one of the one or more retention members to the corresponding release position, and (v) movement of the release member from the retained position to the exterior space.

Example 30

The release apparatus of Example 29 further comprising first and second isolation members, wherein: (H') a second end of the restraining wire is held by a second one of the one or more fuse wires, thereby holding the restraining wire in the tightened coil arrangement against the coil bias force, and with a second electrical actuation current flowing through the second one of the one or more fuse wires, the coil bias force is sufficient to break the second one of the one or more fuse wires; (I') the restraining wire is arranged so that breakage of only the first one of the one or more fuse wires, breakage of only the second one of the one or more fuse wires, or breakage of both the first and second ones of the one or more fuse wires enables (i) movement of the restraining wire from the tightened coil arrangement to the loosened coil arrangement in response to the coil bias force, (ii) movement of the one or more sleeve retainers from the corresponding sleeve-retention positions to the corresponding sleeve-release positions, (iii) movement of the retention sleeve from the engaged position to the disengaged position in response to the sleeve bias force, (iv) movement of the one or more retention members from the corresponding retention positions to the corresponding release positions, and (v) movement of the release member from the retained position to the exterior space; and (J) the first end of the restraining wire is insulated electrically from the first fuse wire by the first isolation member, and the second end of the restraining wire is insulated electrically from the second fuse wire by the second isolation member.

Example 31

The release apparatus of Example 30 further comprising first and second electrically insulating fuse wire retainers and first and second pairs of lead wires, wherein (i) the first fuse wire is connected to a source of the first actuation current by the first pair of lead wires, (ii) the first fuse wire and the first pair of lead wires are held in place by the first fuse wire retainer, (iii) the first fuse wire is insulated from the housing by the first fuse wire retainer, (iv) the second fuse wire is connected to a source of the second actuation current by the second pair of lead wires, (v) the second fuse wire and the second pair of lead wires are held in place by the second fuse wire retainer, (vi) the second fuse wire is insulated from the housing by the second fuse wire retainer, and (vii) the respective sources of the first and second actuation currents are independent of one another.

Example 32

The release apparatus of Example 31 wherein (i) each end of the first fuse wire is wound around a contact portion of a corresponding one of the first pair of lead wires and (ii) each end of the second fuse wire is wound around a contact portion of a corresponding one of the second pair of lead wires.

Example 33

The release apparatus of any one of Examples 31 or 32 wherein (i) each end of the first fuse wire is welded or soldered to a contact portion of a corresponding one of the first pair of lead wires and (ii) each end of the second fuse wire is welded or soldered to a contact portion of a corresponding one of the second pair of lead wires.

Example 34

The release apparatus of any one of Examples 30 through 33 wherein each isolation member comprises one or more ceramic materials.

Example 35

The release apparatus of any one of Examples 30 through 34 wherein the first fuse wire is received in a groove or slot of the first isolation member, and the second fuse wire is received in a groove or slot of the second isolation member.

Example 36

The release apparatus of any one of Examples 30 through 35 wherein, with the restraining wire held in the tightened coil arrangement by the first and second fuse wires, (i) the first fuse wire is arranged in a "U" or "V" shape with the first isolation member positioned against a central portion of the U- or V-shaped first fuse wire between opposite side portions of the U- or V-shaped first fuse wire, and (ii) the second fuse wire is arranged in a "U" or "V" shape with the second isolation member positioned against a central portion of the U- or V-shaped second fuse wire between opposite side portions of the U- or V-shaped second fuse wire.

Example 37

The release apparatus of any one of Examples 30 through 36 wherein the first end of the restraining wire is received in a hole in the first isolation member, and the second end of the restraining wire is received in a hole in the second isolation member.

Example 38

The release apparatus of any one of Examples 29 through 37 wherein, with the release member in the retained position and the one or more retention members in the corresponding retention positions, an oblique engagement surface of each one of the one or more retention members engages a corresponding oblique engagement surface of the release member, so that a load force on the release member biasing the release member away from the retained position results in a transmitted force biasing the one or more retention members toward the corresponding release positions.

Example 39

The release apparatus of any one of Examples 29 through 38 further comprising one or more bias members, wherein each one of the one or more bias members is arranged so as to bias movement of a corresponding one of the one or more retention members toward the corresponding release position.

Example 40

The release apparatus of any one of Examples 29 through 39 wherein movement of the one or more retention members toward the corresponding release positions is substantially perpendicular to movement of the release member from the retained position to the exterior space.

Example 41

The release apparatus of any one of Examples 29 through 40 wherein the release member includes a threaded portion arranged for engaging a deployable component.

Example 42

The release apparatus of any one of Examples 29 through 41 wherein, with the release member in the retained position, the release member engages a portion of the housing so as to obstruct rotation of the release member about an axis substantially parallel to movement of the release member from the retained position to the exterior space.

Example 43

The release apparatus of any one of Examples 29 through 42 wherein a portion of the housing is arranged so as to constrain movement of each one of the one or more retention members to substantially radial movement between the corresponding retention and release positions.

Example 44

The release apparatus of any one of Examples 29 through 43 wherein the restraining wire comprises stainless steel.

Example 45

The release apparatus of any one of Examples 29 through 44 wherein the one or more fuse wires comprise stainless steel.

Example 46

The release apparatus of any one of Examples 29 through 45 wherein the one or more fuse wires are between about 0.1 mm and about 0.2 mm in thickness.

Example 47

The release apparatus of any one of Examples 29 through 46 wherein the electrical actuation current is between about 2 A and about 3 A.

Example 48

The release apparatus of any one of Examples 29 through 47 wherein the retention sleeve includes a polygonal inner surface, and each one of the one or more rolling bearing elements is a cylindrical bearing element positioned between a corresponding face of the polygonal inner surface and a corresponding one of the retention members.

Example 49

The release apparatus of any one of Examples 29 through 48 further comprising a spring positioned within the retention sleeve and arranged so as to provide the sleeve bias force.

Example 50

The release apparatus of any one of Examples 29 through 49 wherein (i) the housing is attached to a body of a satellite, (ii) the release member is attached to a deployable component of the satellite, (iii) with the release member held in the retained position by the one or more retention members in the corresponding retention positions, the release member holds the deployable component in a non-deployed arrangement, and (iv) with the one or more retention members in the corresponding release positions, movement of the release member from the retained position to the exterior space enables movement of the deployed component from the non-deployed arrangement into a deployed arrangement.

Example 51

A method for using the release apparatus of Example 50, the method comprising flowing the first actuation current through the first one of the one or more fuse wires so as to cause breakage of at least the first one of the one or more fuse wires, thereby enabling (1) movement of the restraining wire from the tightened coil arrangement to the loosened coil arrangement in response to the coil bias force, (2) movement of the one or more sleeve retainers from the corresponding sleeve-retention positions to the corresponding sleeve-release positions, (3) movement of the retention sleeve from the engaged position to the disengaged position in response to the sleeve bias force, (4) movement of the one or more retention members from the corresponding retention positions to the corresponding release positions, and (5) movement of the release member from the retained position to the exterior space.

Example 52

A method for making the release apparatus of any one of Examples 29 through 50, the method comprising: (a) inserting the release member into the housing in the retained position; (b) inserting the one or more retention members into the housing in the corresponding retention positions; (c) positioning each one of the one or more rolling bearing elements against a corresponding one of the one or more retention members; (d) inserting the retention sleeve into the housing in the engaged position and biasing the retention sleeve toward the disengaged position; (e) coiling the restraining wire around the one or more sleeve retainers with the restraining wire in the tightened coil arrangement and the one or more sleeve retainers in the corresponding sleeve-retention positions; (f) arranging the first one of the one or more fuse wires to hold the first end of the restraining wire against the coil bias force with the restraining wire in the tightened coil arrangement; and (g) inserting the one or more sleeve retainers into the housing in the corresponding sleeve-retaining positions and with the retention sleeve in the engaged position.

Example 53

The method of Example 52 further comprising attaching the housing to a body of a satellite, attaching a deployable component of the satellite to the release member, and connecting the first one of the one or more fuse wires to a source of the first actuation current, wherein (1) with the release member held in the retained position by the one or more retention members in the corresponding retention positions, the release member holds the deployable component in a non-deployed arrangement, and (2) with the one or more retention members in the corresponding release positions, movement of the release member from the retained position to the exterior space enables movement of the deployed component from the non-deployed arrangement into a deployed arrangement.

Example 54

A method for using the release apparatus of any one of Examples 29 through 50, the method comprising flowing the first actuation current through the first one of the one or more fuse wires so as to cause breakage of at least the first one of the one or more fuse wires, thereby enabling (1) movement of the restraining wire from the tightened coil arrangement to the loosened coil arrangement in response to the coil bias force, (2) movement of the one or more sleeve retainers from the corresponding sleeve-retention positions to the corresponding sleeve-release positions, (3) movement of the retention sleeve from the engaged position to the disengaged position in response to the sleeve bias force, (4) movement of the one or more retention members from the corresponding retention positions to the corresponding release positions, and (5) movement of the release member from the retained position to the exterior space.

Example 55

A method for repairing, refurbishing, or resetting the release apparatus of any one of Examples 29 through 50 after breakage of at least the first one of the one or more fuse wires, the method comprising: (a) reinserting the release member into the housing in the retained position, moving the one or more retention members into the corresponding retention positions, and moving the retention sleeve into the engaged position; and (b) replacing one or more of the restraining wire, at least the first one of the one or more fuse wires, or at least one of the one or more sleeve retainers, (c) wherein, after the replacement of part (b), (i) the restraining wire is arranged in the tightened coil arrangement, (ii) the first one of the one or more fuse wires is arranged within the housing to hold the first end of the restraining wire against the coil bias force, and (iii) the one or more sleeve retainers are arranged in the corresponding sleeve-retention positions.

Example 56

A method for repairing, refurbishing, or resetting the release apparatus of any one of Examples 29 through 50 after breakage of at least the first one of the one or more fuse wires, the method comprising: (a) reinserting the release member into the housing in the retained position, moving the one or more retention members into the corresponding retention positions, and moving the retention sleeve into the engaged position; and (b) replacing the restraining wire, the one or more fuse wires, and the one or more sleeve retainers, (c) wherein, after the replacement of part (b), (i) the restraining wire is arranged in the tightened coil arrangement, (ii) the first one of one or more fuse wires is arranged within the housing to hold the first end of the restraining wire against the coil bias force, and (iii) the one or more sleeve retainers are arranged in the corresponding sleeve-retention positions.

Example 57

The method of Example 56 wherein, for the replacement of part (b), the restraining wire, the one or more fuse wires, and the one or more sleeve retainers are arranged in a pre-assembled initiator assembly.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure by the aforementioned incorporation of the appended claims into the Detailed Description, each of the dependent claims so incorporated shall be interpreted, only for purposes of the disclosure by the incorporation into the Detailed Description, as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise. For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

In the appended claims, any labelling of elements, steps, limitations, or other portions of a claim (e.g., first, second, etc., (a), (b), (c), etc., or (i), (ii), (iii), etc.) is only for purposes of clarity, and shall not be construed as implying any sort of ordering or precedence of the claim portions so labelled. If any such ordering or precedence is intended, it will be explicitly recited in the claim or, in some instances, it will be implicit or inherent based on the specific content of the claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A hold-down release apparatus comprising a housing, a release member, one or more retention members, a restraining wire, first and second fuse wires, and first and second isolation members, wherein:

(A) each one of the one or more retention members is movable within the housing between a corresponding retention position and a corresponding release position;

(B) with each one of the one or more retention members in the corresponding release position, the release member is moveable from a retained position at least partly within the housing to an exterior space outside the housing;

(C) with each one of the one or more retention members in the corresponding retention position, the one or more retention members obstruct movement of the release member from the retained position to the exterior space;

(D) the restraining wire (i) forms multiple coils, (ii) is moveable between a tightened coil arrangement and a loosened coil arrangement, (iii) is biased toward the loosened coil arrangement by a coil bias force, (iv) in the tightened coil arrangement, obstructs movement of each one of the one or more retention members from the corresponding retention position to the corresponding release position, and (v) in the loosened coil arrangement, permits movement of each one of the one or more retention members from the corresponding retention position to the corresponding release position;

(E) a first end of the restraining wire is held by the first fuse wire and a second end of the restraining wire is held by the second fuse wire, thereby holding the restraining wire in the tightened coil arrangement against the coil bias force;

(F) the first end of the restraining wire is insulated electrically from the first fuse wire by the first isolation member, and the second end of the restraining wire is insulated electrically from the second fuse wire by the second isolation member;

(G) with a first electrical actuation current flowing through the first fuse wire, the coil bias force is sufficient to break the first fuse wire, and with a second electrical actuation current flowing through the second fuse wire, the coil bias force is sufficient to break the second fuse wire; and (H) the restraining wire is arranged so that breakage of only the first fuse wire, breakage of only the second fuse wire, or breakage of both the first and second fuse wires is sufficient to enable (i) movement of the restraining wire from the tightened coil arrangement to the loosened coil arrangement in response to the coil bias force, (ii) movement of the one or more retention members from the corresponding retention positions to the corresponding release positions, and (iii) movement of the release member from the retained position to the exterior space.

2. The release apparatus of claim 1 wherein the multiple coils formed by the restraining wire are positioned around the one or more retention members.

3. The release apparatus of claim 1 further comprising one or more secondary retention members wherein:

(i) each one of the one or more secondary retention members is movable within the housing between a corresponding secondary retention position and a corresponding secondary release position;

(ii) with each one of the one or more secondary retention members in the corresponding secondary release position, the one or more retention members are moveable from the corresponding retention positions to the corresponding release positions;

(iii) with each one of the one or more secondary retention members in the corresponding secondary retention position, movement of the one or more retention members from the corresponding retention positions to the corresponding release positions is obstructed;

(iv) the multiple coils formed by the restraining wire are positioned around at least one of the one or more secondary retention members;

(v) with the restraining wire in the tightened coil arrangement, the restraining wire obstructs movement of the one or more secondary retention members from the corresponding secondary retention positions to the corresponding secondary release positions, thereby obstructing movement of the one or more retention members from the corresponding retention positions to the corresponding release positions; and (vi) with the restraining wire in the loosened coil arrangement, the restraining wire permits movement of the one or more secondary retention members from the corresponding secondary retention positions to the corresponding secondary release positions, thereby permitting movement of the one or more retention members from the corresponding retention positions to the corresponding release positions.

4. The release apparatus of claim 1 further comprising first and second electrically insulating fuse wire retainers and first and second pairs of lead wires, wherein (i) the first fuse wire is connected to a source of the first actuation current by the first pair of lead wires, (ii) the first fuse wire and the first pair of lead wires are held in place by the first fuse wire retainer, (iii) the first fuse wire is insulated from the housing by the first fuse wire retainer, (iv) the second fuse wire is connected to a source of the second actuation current by the second pair of lead wires, (v) the second fuse wire and the second pair of lead wires are held in place by the second fuse wire retainer, (vi) the second fuse wire is insulated from the housing by the second fuse wire retainer, and (vii) the respective sources of the first and second actuation currents are independent of one another.

5. The release apparatus of claim 4 wherein (i) each end of the first fuse wire is wound around a contact portion of a corresponding one of the first pair of lead wires and (ii) each end of the second fuse wire is wound around a contact portion of a corresponding one of the second pair of lead wires.

6. The release apparatus of claim 4 wherein (i) each end of the first fuse wire is welded or soldered to a contact portion of a corresponding one of the first pair of lead wires and (ii) each end of the second fuse wire is welded or soldered to a contact portion of a corresponding one of the second pair of lead wires.

7. The release apparatus of claim 1 wherein each isolation member comprises one or more ceramic materials.

8. The release apparatus of claim 1 wherein the first fuse wire is received in a groove or slot of the first isolation member, and the second fuse wire is received in a groove or slot of the second isolation member.

9. The release apparatus of claim 1 wherein, with the restraining wire held in the tightened coil arrangement by the first and second fuse wires, (i) the first fuse wire is arranged in a "U" or "V" shape with the first isolation member positioned against a central portion of the U- or V-shaped first fuse wire between opposite side portions of the U- or V-shaped first fuse wire, and (ii) the second fuse wire is arranged in a "U" or "V" shape with the second isolation member positioned against a central portion of the U- or V-shaped second fuse wire between opposite side portions of the U- or V-shaped second fuse wire.

10. The release apparatus of claim 1 wherein the first end of the restraining wire is received in a hole in the first isolation member, and the second end of the restraining wire is received in a hole in the second isolation member.

11. The release apparatus of claim 1 wherein, with the release member in the retained position and the one or more retention members in the corresponding retention positions, an oblique engagement surface of each one of the one or more retention members engages a corresponding oblique engagement surface of the release member, so that a load force on the release member biasing the release member away from the retained position results in a transmitted force biasing the one or more retention members toward the corresponding release positions.

12. The release apparatus of claim 1 further comprising one or more bias members, wherein each one of the one or more bias members is arranged so as to bias movement of a corresponding one of the one or more retention members toward the corresponding release position.

13. The release apparatus of claim 1 wherein movement of the one or more retention members toward the corresponding release positions is substantially perpendicular to movement of the release member from the retained position to the exterior space.

14. The release apparatus of claim 1 wherein the release member includes a threaded portion arranged for engaging a deployable component.

15. The release apparatus of claim 1 wherein, with the release member in the retained position, the release member engages a portion of the housing so as to obstruct rotation of the release member about an axis substantially parallel to movement of the release member from the retained position to the exterior space.

16. The release apparatus of claim 1 wherein a portion of the housing is arranged so as to constrain movement of each one of the one or more retention members to substantially radial movement between the corresponding retention and release positions.

17. The release apparatus of claim 1 wherein the restraining wire comprises stainless steel.

18. The release apparatus of claim 1 wherein the first and second fuse wires comprise stainless steel.

19. The release apparatus of claim 1 wherein the one or more fuse wires are between about 0.1 mm and about 0.2 mm in thickness.

20. The release apparatus of claim 1 the first or second electrical actuation current is between about 2 A and about 3 A.

21. The release apparatus of claim 1 wherein (i) the housing is attached to a body of a satellite, (ii) the release member is attached to a deployable component of the satellite, (iii) with the release member held in the retained position by the one or more retention members in the corresponding retention positions, the release member holds the deployable component in a non-deployed arrangement, and (iv) with the one or more retention members in the corresponding release positions, movement of the release member from the retained position to the exterior space enables movement of the deployed component from the non-deployed arrangement to a deployed arrangement.

22. A method for using the release apparatus of claim 21, the method comprising:

(a) flowing the first actuation current through the first fuse wire so as to cause breakage of the first fuse wire; or (b) flowing the second actuation current through the second fuse first wire so as to cause breakage of the second fuse wire, (c) thereby enabling (1) movement of the restraining wire from the tightened coil arrangement to the loosened coil arrangement in response to the coil bias force, (2) movement of the one or more retention members from the corresponding retention positions to the corresponding release positions, and (3) movement of the release member from the retained position to the exterior space.

23. A method for making the release apparatus of claim 1, the method comprising:
   (a) inserting the release member into the housing in the retained position;
   (b) inserting the one or more retention members into the housing in the corresponding retention positions;
   (c) coiling the restraining wire with the restraining wire in the tightened coil arrangement and the one or more retention members in the corresponding retention positions;
   (d) arranging the first fuse wire within the housing to hold the first end of the restraining wire against the coil bias force and arranging the second fuse wire within the housing to hold the second end of the restraining wire against the coil bias force; and
   (e) connecting the first fuse wire to a source of the first actuation current and connecting the second fuse wire to a source of the second actuation current, wherein the respective sources of the first and second actuation currents are independent of one another.

24. The method of claim 23 further comprising attaching the housing to a body of a satellite and attaching a deployable component of the satellite to the release member, wherein (1) with the release member held in the retained position by the one or more retention members in the corresponding retention positions, the release member holds the deployable component in a non-deployed arrangement, and (2) with the one or more retention members in the corresponding release positions, movement of the release member from the retained position to the exterior space enables movement of the deployed component from the non-deployed arrangement into a deployed arrangement.

25. A method for using the release apparatus of claim 1, the method comprising:
   (a) flowing the first actuation current through the first fuse wire so as to cause breakage of the first fuse wire; or
   (b) flowing the second actuation current through the second fuse wire so as to cause breakage of the second fuse wire,
   (c) thereby enabling (1) movement of the restraining wire from the tightened coil arrangement to the loosened coil arrangement in response to the coil bias force, (2) movement of the one or more retention members from the corresponding retention positions to the corresponding release positions, and (3) movement of the release member from the retained position to the exterior space.

26. A method for repairing, refurbishing, or resetting the release apparatus of claim 1 after breakage of the first or second fuse wire, the method comprising:
   (a) reinserting the release member into the housing in the retained position and moving the one or more retention members into the corresponding retention positions; and
   (b) replacing one or more of tithe restraining wire, ii the first or second fuse wires, or (iii) the first or second isolation members,
   (c) wherein, after replacing the restraining wire, the first or second fuse wires, or the first or second isolation members, (i) the restraining wire is arranged in the tightened coil arrangement, (ii) the first fuse wire is arranged within the housing to hold the first end of the restraining wire against the coil bias force, (iii) the second fuse wire is arranged within the housing to hold the second end of the restraining wire against the coil bias force, (iv) the first isolation member is arranged so as to insulate electrically the first end of the restraining wire from the first fuse wire, and (v) the second isolation member is arranged so as to insulate electrically the second end of the restraining wire from the second fuse wire.

27. A method for repairing, refurbishing, or resetting the release apparatus of claim 1 after breakage of the first or second fuse wire, the method comprising:
   (a) reinserting the release member into the housing in the retained position and moving the one or more retention members into the corresponding retention positions; and
   (b) replacing the restraining wire, the first and second fuse wires, and the first and second isolation members,
   (c) wherein, after replacing the restraining wire, the first and second fuse wires, and the first and second isolation members, (i) the restraining wire is arranged in the tightened coil arrangement, (ii) the first fuse wire is arranged within the housing to hold the first end of the restraining wire against the coil bias force, (iii) the second fuse wire is arranged within the housing to hold the second end of the restraining wire against the coil bias force, (iv) the first isolation member is arranged so as to insulate electrically the first end of the restraining wire from the first fuse wire, and (v) the second isolation member is arranged so as to insulate electrically the second end of the restraining wire from the second fuse wire.

28. A method for repairing, refurbishing, or resetting the release apparatus of claim 1 after breakage of the first or second fuse wire, the method comprising:
   (a) reinserting the release member into the housing in the retained position and moving the one or more retention members into the corresponding retention positions; and
   (b) replacing the restraining wire, the first and second fuse wires, and the first and second isolation members, with the restraining wire, the first and second fuse wires, and the first and second isolation members arranged in a pre-assembled initiator assembly,
   (c) wherein, after replacing the restraining wire, the first and second fuse wires, and the first and second isolation members, (i) the restraining wire is arranged in the tightened coil arrangement, (ii) the first fuse wire is arranged within the housing to hold the first end of the restraining wire against the coil bias force, (iii) the second fuse wire is arranged within the housing to hold the second end of the restraining wire against the coil bias force, (iv) the first isolation member is arranged so as to insulate electrically the first end of the restraining wire from the first fuse wire, and (v) the second isolation member is arranged so as to insulate electrically the second end of the restraining wire from the second fuse wire.

* * * * *